United States Patent
Nooren

(10) Patent No.: US 9,039,029 B2
(45) Date of Patent: May 26, 2015

(54) TRANSPORT TRAILER WITH ADJUSTABLE-WIDTH SWING ARMS

(71) Applicant: Mammoet USA South Inc., Rosharon, TX (US)

(72) Inventor: Piet Nooren, Lake Jackson, TX (US)

(73) Assignee: Mammoet USA South, Inc., Rosharon, TX (US)

( * ) Notice: Subject to any disclaimer, the term of this patent is extended or adjusted under 35 U.S.C. 154(b) by 0 days.

(21) Appl. No.: 13/962,311

(22) Filed: Aug. 8, 2013

(65) Prior Publication Data

US 2015/0042068 A1 Feb. 12, 2015

(51) Int. Cl.
*B60P 3/40* (2006.01)
*B62B 5/00* (2006.01)
*B62D 53/06* (2006.01)

(52) U.S. Cl.
CPC ............... *B60P 3/40* (2013.01); *B62B 5/0083* (2013.01); *B62D 53/067* (2013.01)

(58) Field of Classification Search
CPC ........ B60P 3/40; B62B 5/0083; B62D 53/067
USPC ........................................................ 280/404
See application file for complete search history.

(56) References Cited

U.S. PATENT DOCUMENTS

| | | | | |
|---|---|---|---|---|
| 2,968,490 A | * | 1/1961 | Baus | 280/35 |
| 3,160,288 A | * | 12/1964 | Kelly | 414/787 |
| 3,612,312 A | * | 10/1971 | Behrmann | 414/812 |
| 3,738,682 A | * | 6/1973 | Ritter | 280/413 |
| 3,791,673 A | * | 2/1974 | Hornung | 172/311 |
| 4,034,623 A | * | 7/1977 | Boone et al. | 74/522 |
| 4,504,076 A | * | 3/1985 | Bedney | 172/311 |
| 4,943,078 A | * | 7/1990 | McGhie et al. | 280/408 |
| 5,113,956 A | * | 5/1992 | Friesen et al. | 172/311 |
| 5,715,893 A | * | 2/1998 | Houck | 172/311 |
| 5,924,168 A | * | 7/1999 | Webb et al. | 16/30 |
| 6,371,505 B1 | * | 4/2002 | Turner, II | 280/441.2 |
| 6,796,572 B1 | * | 9/2004 | McGhie | 280/426 |
| 7,159,888 B1 | * | 1/2007 | Sutton et al. | 280/411.1 |
| 7,510,205 B2 | * | 3/2009 | Bellezza Quater et al. | 280/492 |
| 8,424,897 B1 | * | 4/2013 | Sutton et al. | 280/444 |
| 2007/0264110 A1 | * | 11/2007 | Rhodes et al. | 414/458 |
| 2009/0067952 A1 | * | 3/2009 | Rhodes et al. | 414/12 |
| 2013/0015631 A1 | * | 1/2013 | Holland et al. | 280/98 |

* cited by examiner

*Primary Examiner* — Kevin Hurley
*Assistant Examiner* — Michael Stabley
(74) *Attorney, Agent, or Firm* — Spradley PLLC; Michael Spradley

(57) ABSTRACT

A system and method for adjusting the arms of an over-sized trailer is described herein. In one embodiment, the system can comprise a center support, a plurality of swing arms, and a plurality of stabilizer rods. The swing arms can be mounted to the left side and the right side of the center support. The swing arms can each comprise an arm and an arm hinge. The swing arms can be capable of rotating about the arm hinge. Furthermore, a dolly can be capable of being mounted to each swing arms. Each of the stabilizer rods can comprise a first rod portion and a second rod portion. The first rod portion can be connected to the center support and the second rod portion connected to one of the swing arms.

15 Claims, 32 Drawing Sheets

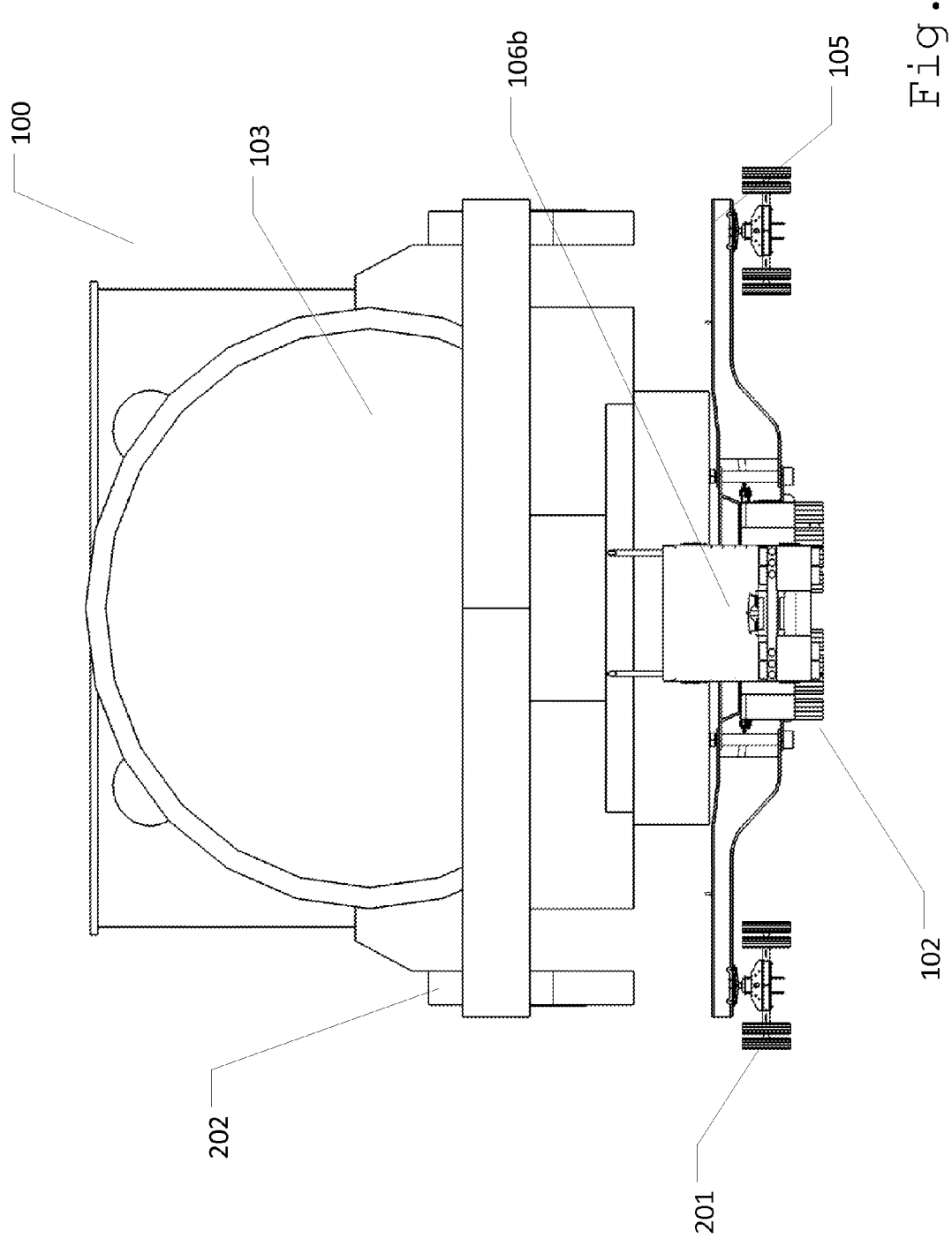

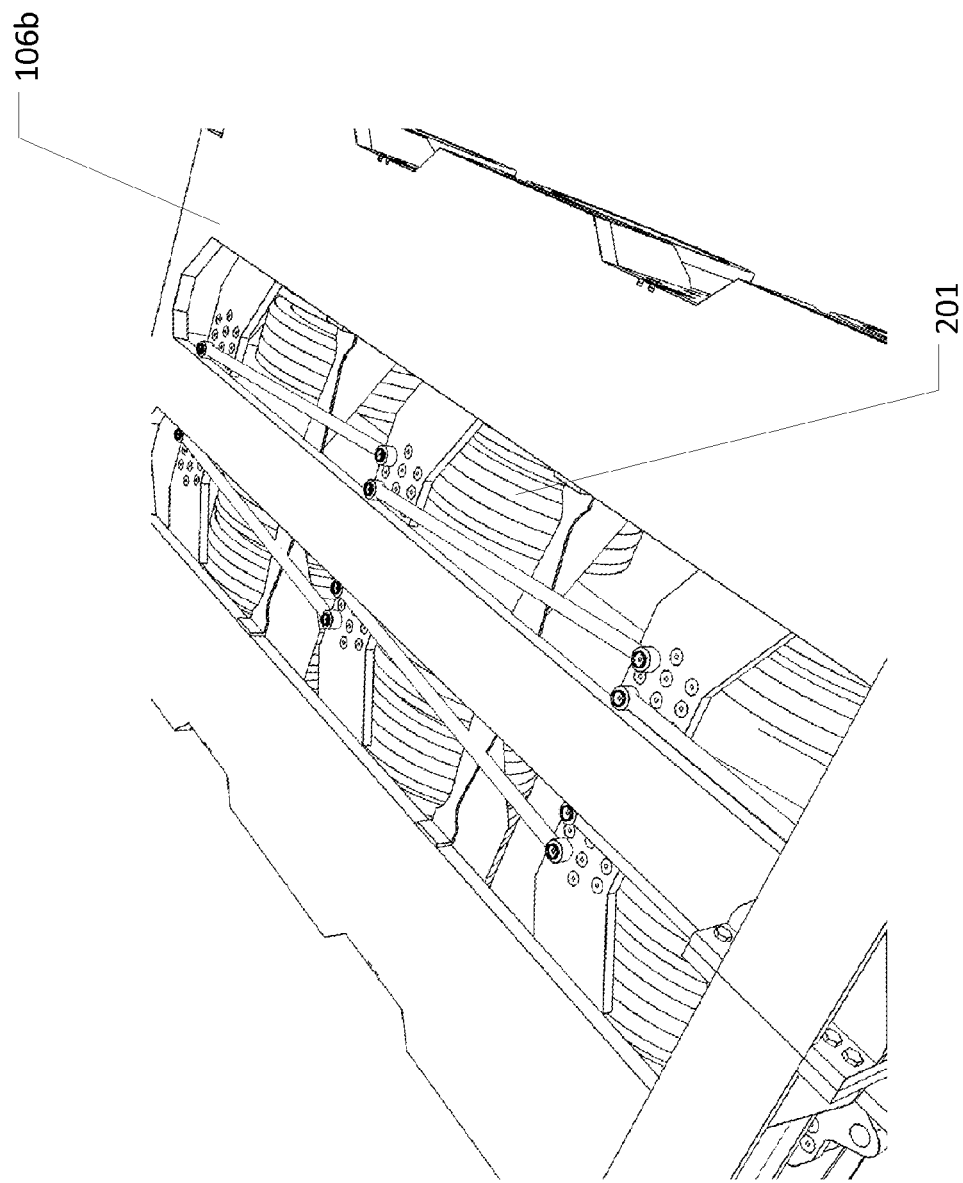

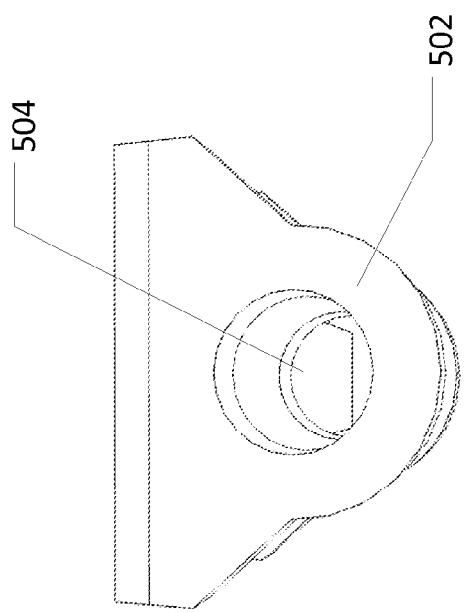
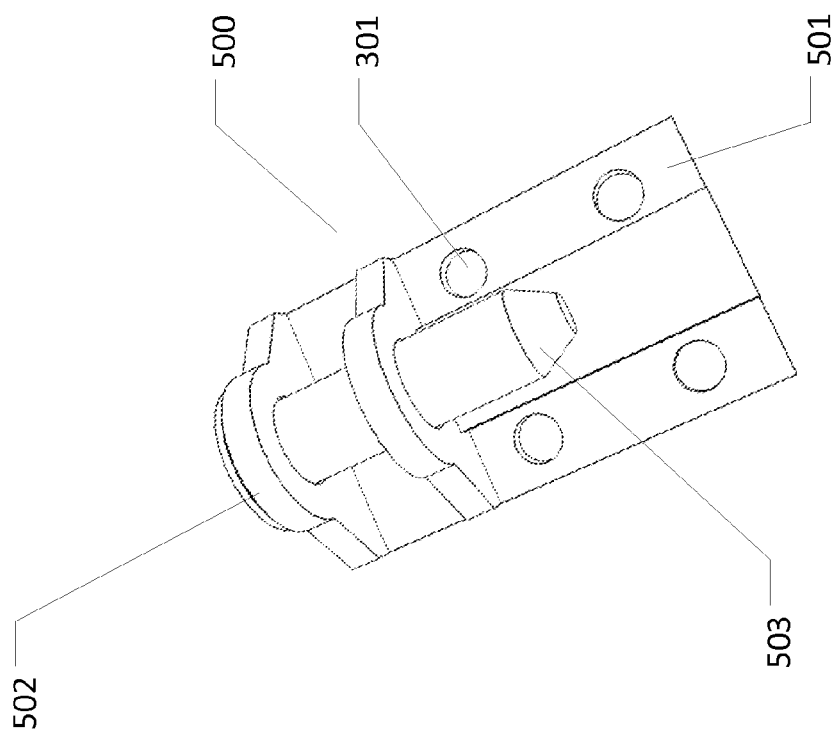
Fig. 5B
Fig. 5A

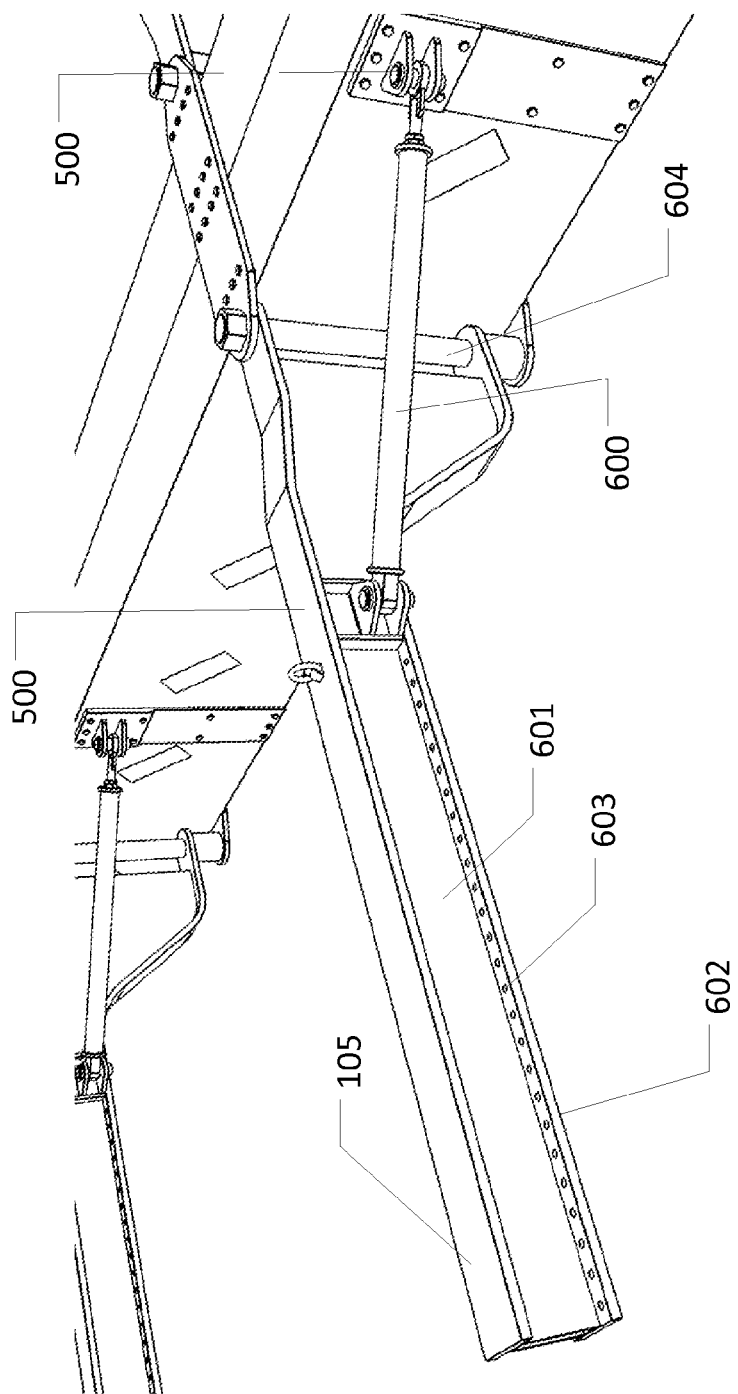

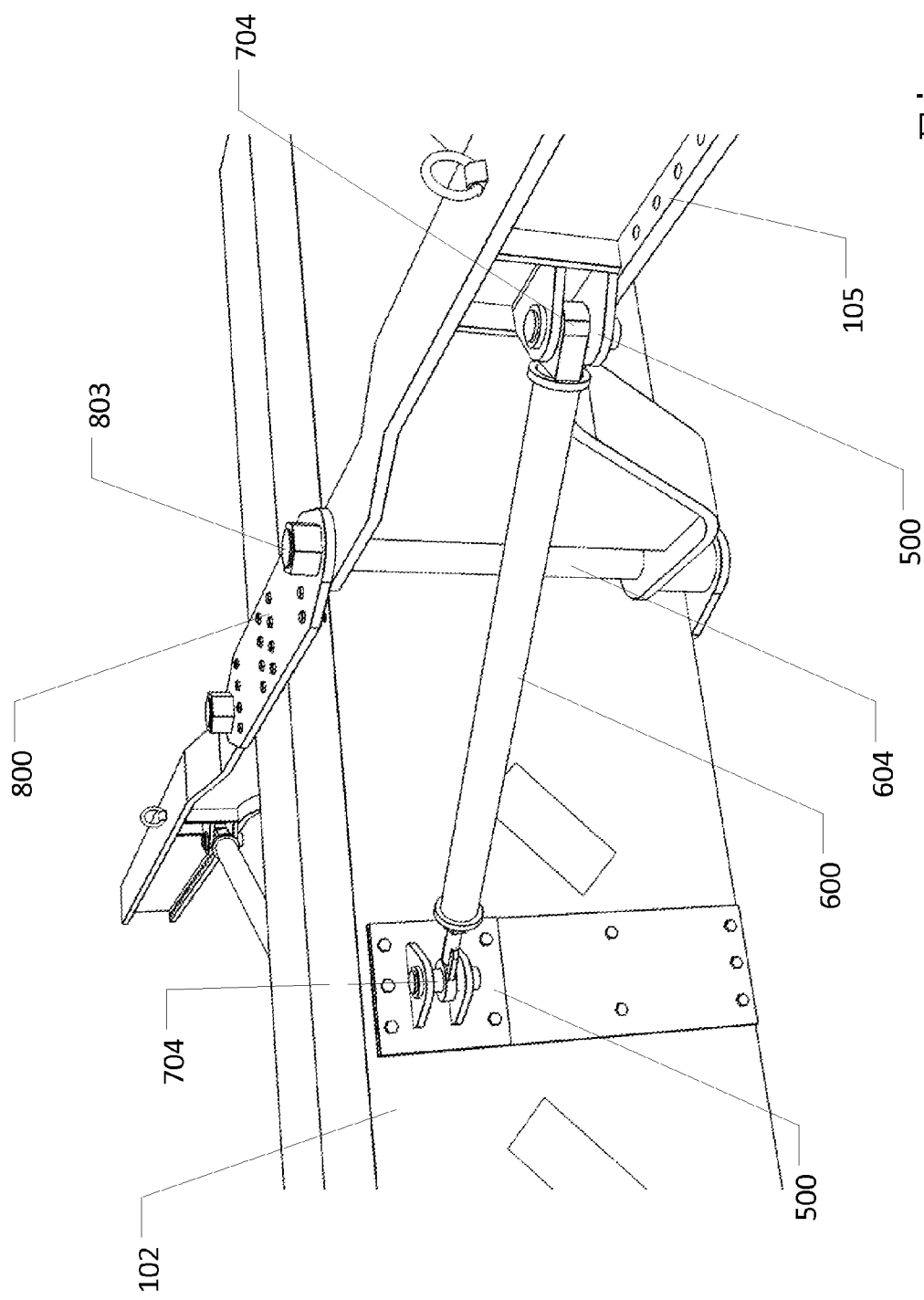

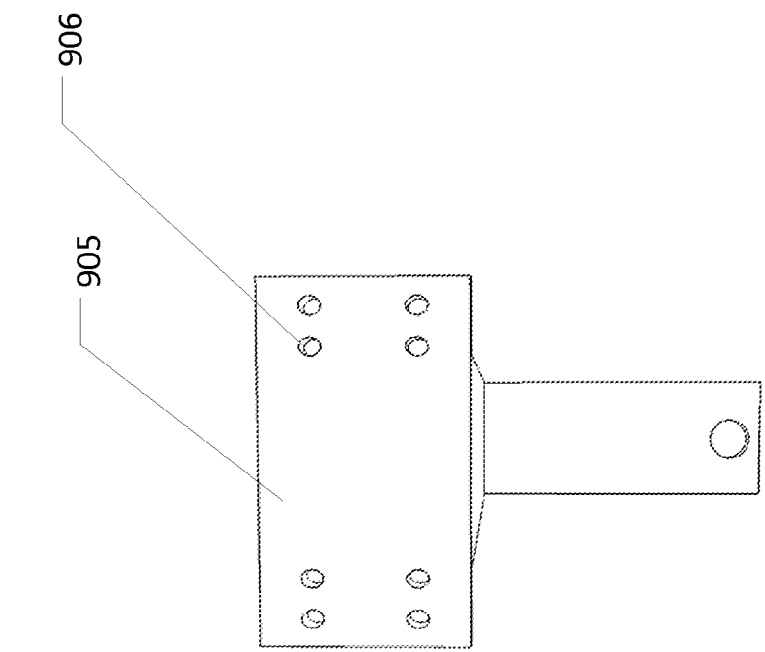
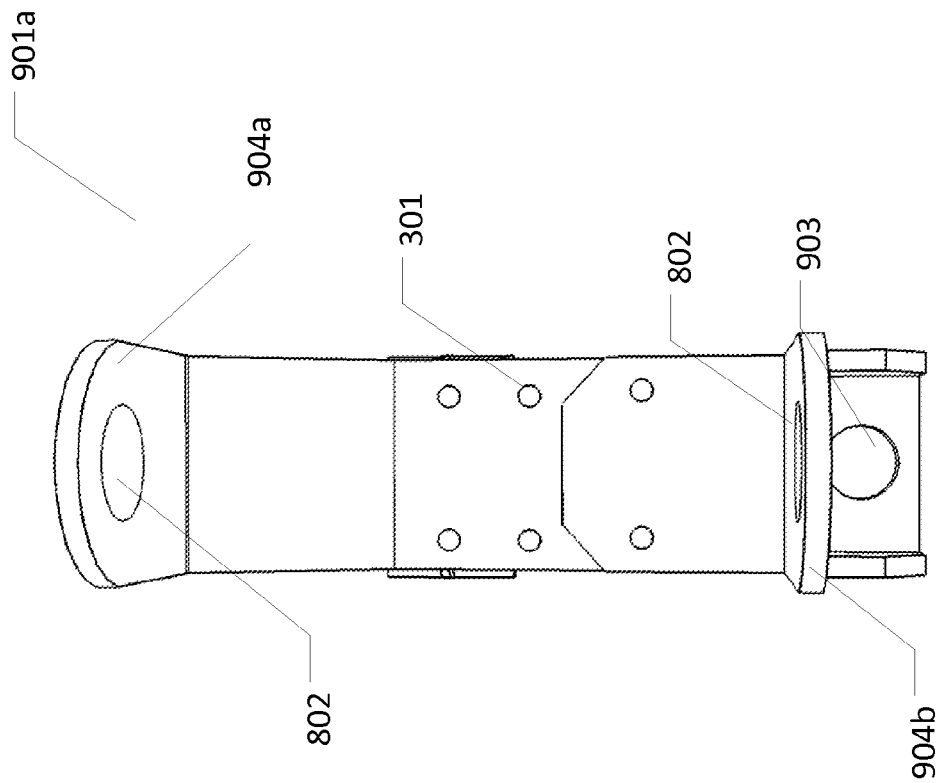
Fig. 9D
Fig. 9C

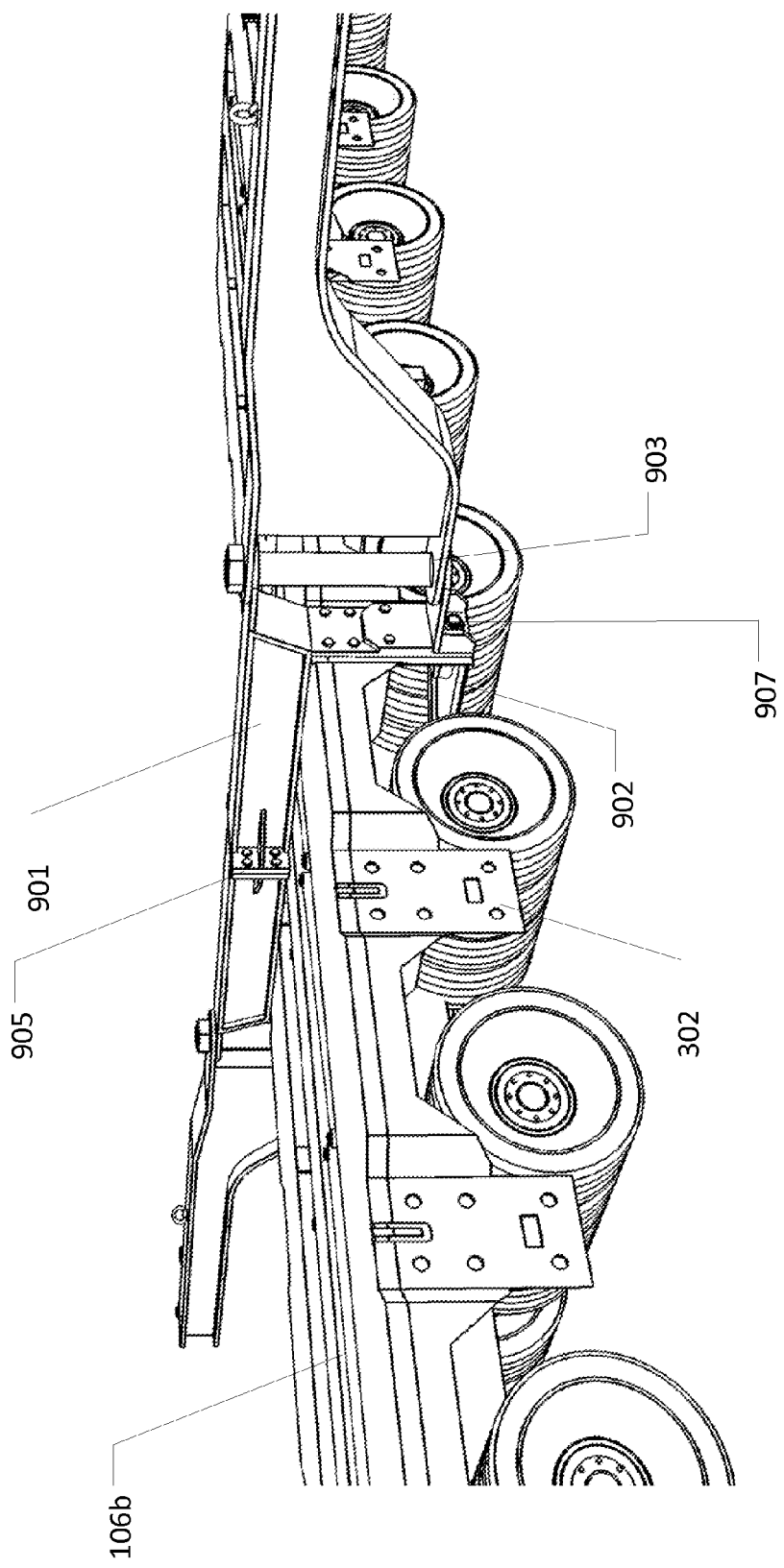

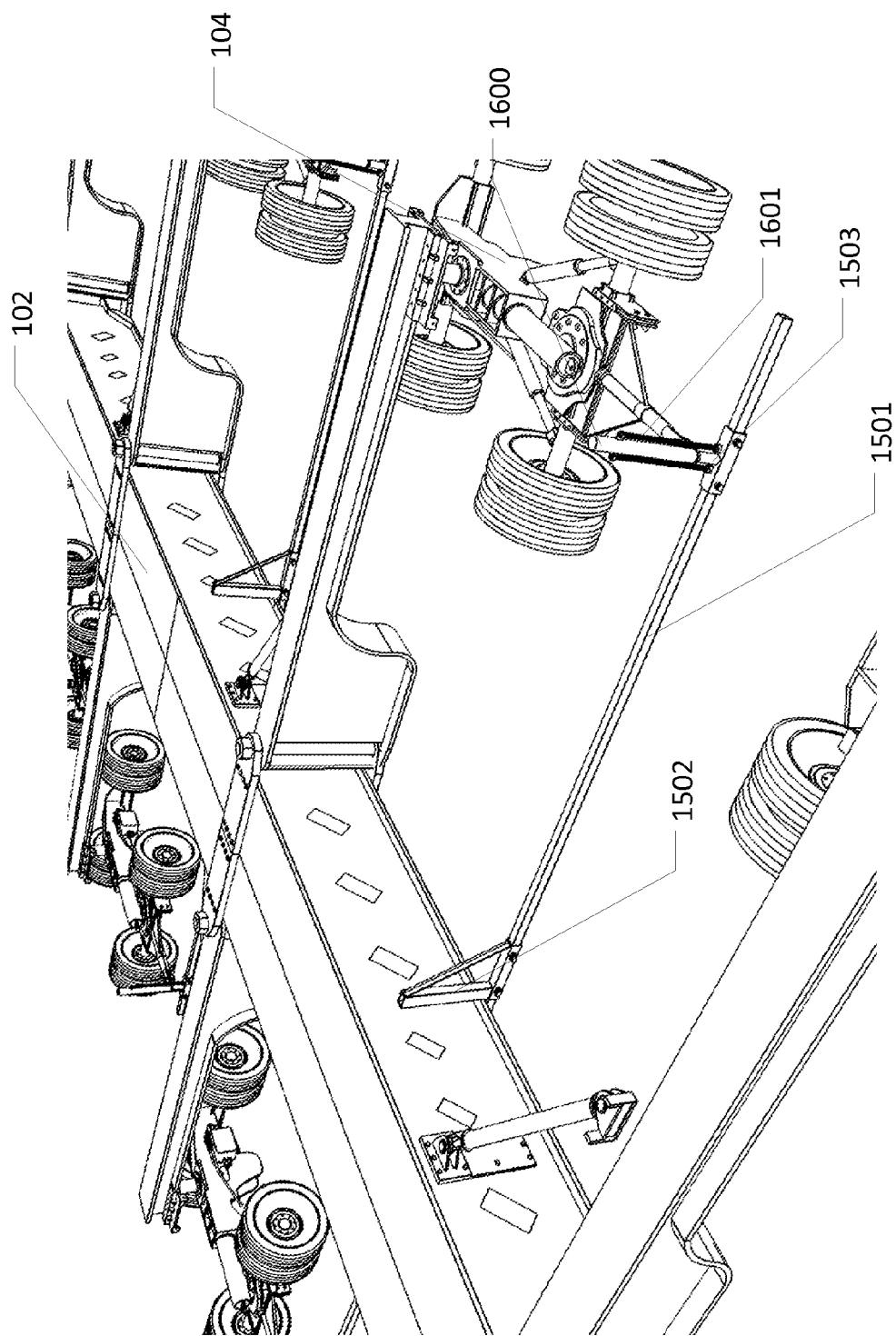

TRANSPORT TRAILER WITH ADJUSTABLE-WIDTH SWING ARMS

BACKGROUND

This disclosure relates to a system and method for adjusting the width of an over-sized trailer using swing arms.

Over the years, transporting over-sized loads has always been a challenge for heavy duty trailers. The issues encountered by heavy duty vehicles in transporting over-sized cargoes rely on the safety standards and/or regulations for public road transport set by the state or by a country. Heavy equipment is often hauled and transported by heavy-duty trailer through public roads, and over intercity routes that can cover several road types. In such case, different weight and size standards may apply as a trailer truck travels from one point to another.

Often, a standard platform trailer is used to accommodate oversize cargo. However, a standard platform trailer's usual load capacity typically ranges from 50,000 lbs. to 80,000 lbs. Moreover, its length ranges from 26 ft. up to 75 ft. Thus, larger or heavier lards may not be accommodated and hauled using such trailer.

Another problem facing the transportation industry is having loads with broad dimensions. For example, tall loads can present issues clearing underneath bridges. This problem can sometimes be addressed if the overall height of a heavy duty trailer is lower.

Another problem is that Further, the width of the wheelbase is also significant for a heavy duty truck since wheelbase can allow or prevent the truck to pass through an area. Present trailers have a fixed wheelbase thus, limiting its usage in carrying only a cargo that has a specific dimension and weight. Moreover, other heavy duty trailers can be difficult to transport even when it does not carry any load because of the extended arms, which adds to the width of the vehicle.

Lastly, since large trailer would usually need to be transported through narrow roads and streets it is imperative that a steering mechanism is installed for better control of the vehicle specially through various curves. However, no present steering mechanism exists that function with the trailer disclosed in this specification.

As such it would be useful to have an improved system and method for adjusting the width of an over-sized trailer.

SUMMARY

A system and method for adjusting the width of an over-sized trailer is described herein. In one embodiment, the system can comprise a center support, a plurality of swing arms, and a plurality of stabilizer rods. The swing arms can be mounted to the left side and the right side of the center support. The swing arms can each comprise an arm and an arm hinge. The swing arms can be capable of rotating about the arm hinge. Furthermore, a dolly can be capable of being mounted to each swing arms. Each of the stabilizer rods can comprise a first rod portion and a second rod portion. The first rod portion can be connected to the center support and the second rod portion connected to one of the swing arms.

BRIEF DESCRIPTION OF THE DRAWINGS

FIG. 2C illustrates a rear view of a dolly-transport system comprising a wheeled center support.
FIG. 4A illustrates a top view of a wheeled center support.
FIG. 5A illustrates a fixed support.
FIG. 5B illustrates a top view of a fixed support further comprising a pin guide orifice.
FIG. 6 illustrates a peripheral view of a swing arm and a stabilizer rod.
FIGS. 8A and 8B illustrate an embodiment of a frame.
FIG. 9C illustrates a front view of a flat beam.
FIG. 9D illustrates a front view of a joint.
FIG. 9F illustrates an assembled frame around a center support.
FIG. 17 illustrates a steering set attached to a trailer and a plurality of dollies.

DETAILED DESCRIPTION

Described herein is an improved system and method for adjusting the width of an over-sized trailer. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
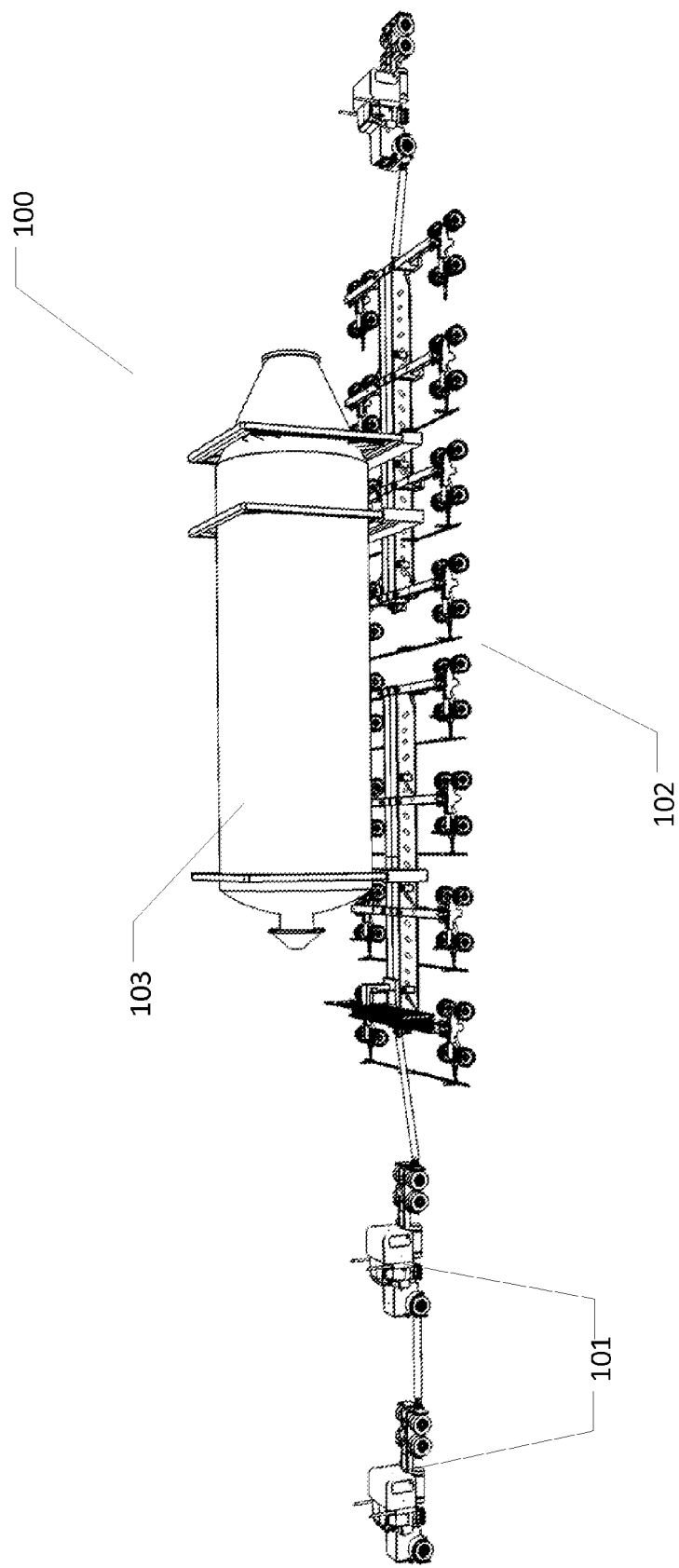
FIG. 1A illustrates a side view of a dolly-transport system carrying a load.

FIG. 1A illustrates a side view of a dolly-transport system 100 carrying a load 103. Dolly-transport trailer system 100 can comprise one or more trucks 101, one or more trailers 102, and a load 103. Truck 101 can be any motor vehicle designed to mount and transport any type of cargo or specialized equipment. Truck 101 can have two or more axles that can provide more torque when traction is needed. Trailer 102 can be any powered or unpowered vehicle used to carry and transport heavy type of equipment, goods, or materials. Trailer 102 can be connected and pulled by truck 101 through a coupling device such as a drawbar or a tow bar.

Dolly-transport system 100 can transport over-sized load 103. In such scenario, load 103 can be positioned in the middle of trailer 102. As a non-limiting example, dolly-transport system 100 can accommodate load 103 that can be up to 99 ft. in length, and 33 ft. in height. In such embodiment, dolly-transport system 100 can carry weight of load 103 of up to 250.4 Te or 552,000 lbs. Further in such embodiment, the overall length of trailer 102 can be up to 155 ft. As such, one or more trucks 101 can be added to trailers 102 to assist in pulling load 103. In such embodiments, the overall length of dolly-transport system 100 can be up to 280 ft. in length that can carry total maximum weight of up to 458.5 Te or 1,010,858 lbs.

Figure 1B:
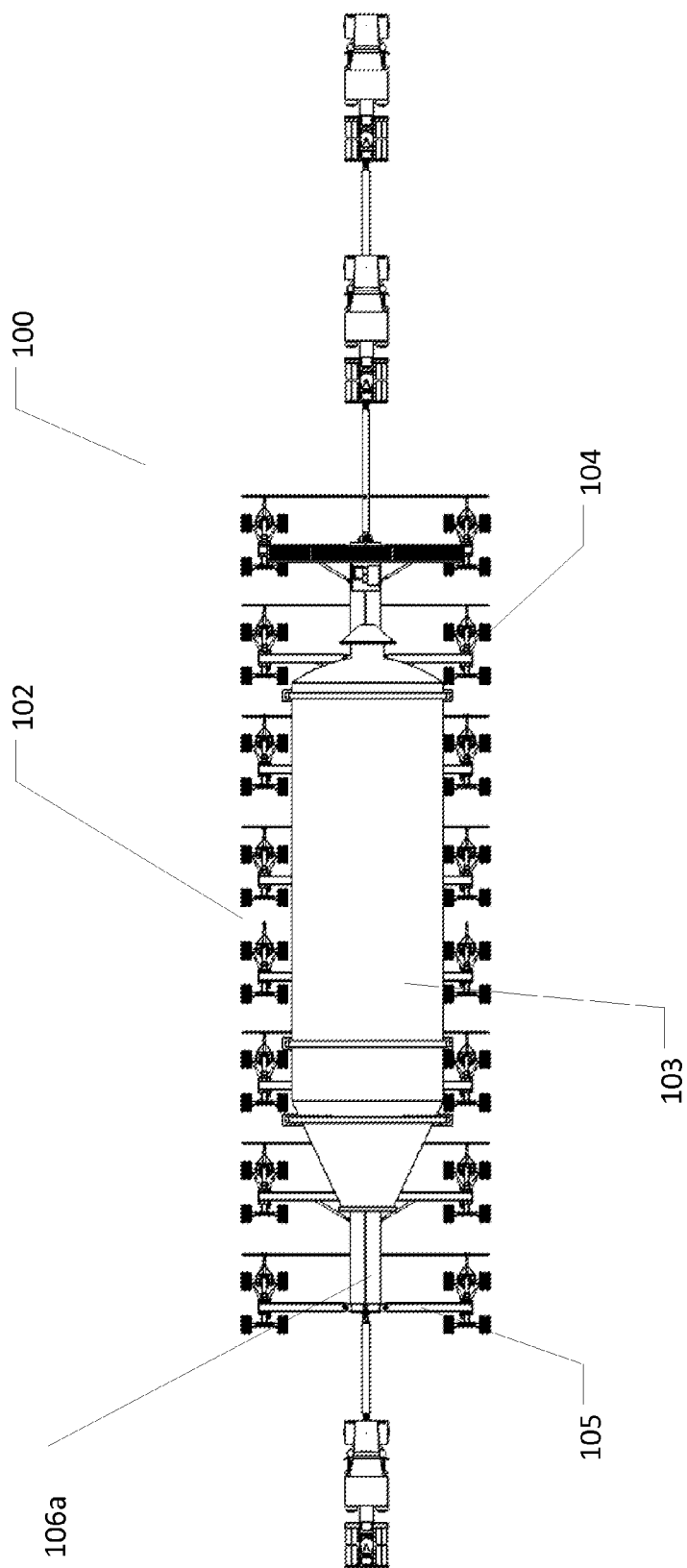
FIG. 1B illustrates a top view of a dolly-transport system.

FIG. 1B illustrates a top view of dolly-transport system 100. In one embodiment, trailer 102 can comprise a center support 106. In one embodiment, center support can be a beam 106a. Trailer 102 can comprise a plurality of dollies 104, and a plurality of swing arms 105. Dolly 104 can be a wheeled platform capable of attaching to swing arms 105 using connections, as discussed below. Swing arms 105 can each mount at opposite sides of center support 106. Swing arm 105 can be a durable solid material such as steel or other metals. Swing arms 105 can be used to attach dolly 104 and trailer 102 together.

In one embodiment, dollies 104 can be spaced in pairs on opposite sides of center support 106. Pairs of swing arms 105 can be staggered or equidistant apart. For example, in one embodiment the distance between dollies 104 pairs can be 9 ft. As another non-limiting example, the maximum weight capacity of each dolly 104 can be up to 51,089 lbs.

Figure 1C:
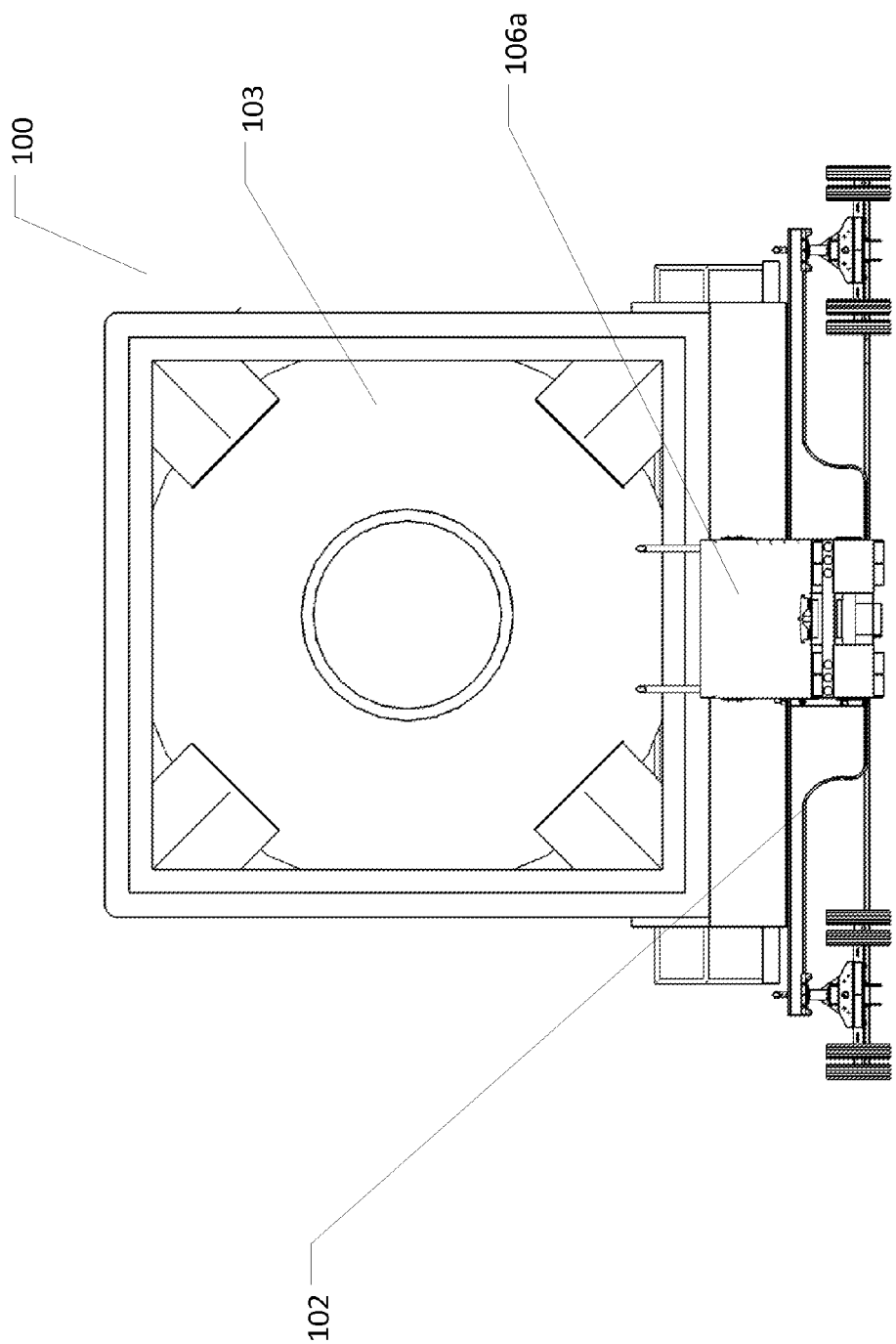
FIG. 1C illustrates a rear view of a dolly-transport system carrying a load.

FIG. 1C illustrates a rear view of dolly-transport system 100 carrying load 103. Load 103 can be placed at the center of trailer 102. As such, the center of gravity of load 103 can be positioned at the middle of trailer 102. This can provide better stability for dolly-transport system 100. Furthermore, trailer 102 can be low in height, allowing trailer 102 to carry taller loads. In one embodiment, trailer 102 can be up to 5 ft. or less in height. Since, trailer 102 can be closer to the ground loading and/or unloading of load 103 can be easier and advantageous especially for over-sized equipment or goods. Moreover, the closer trailer 102 is to the ground the lower the center of gravity. As such, trailer 102 can keep the balance of load 103, adding stability and safety of transport for dolly-transport system 100.

Figure 2A:
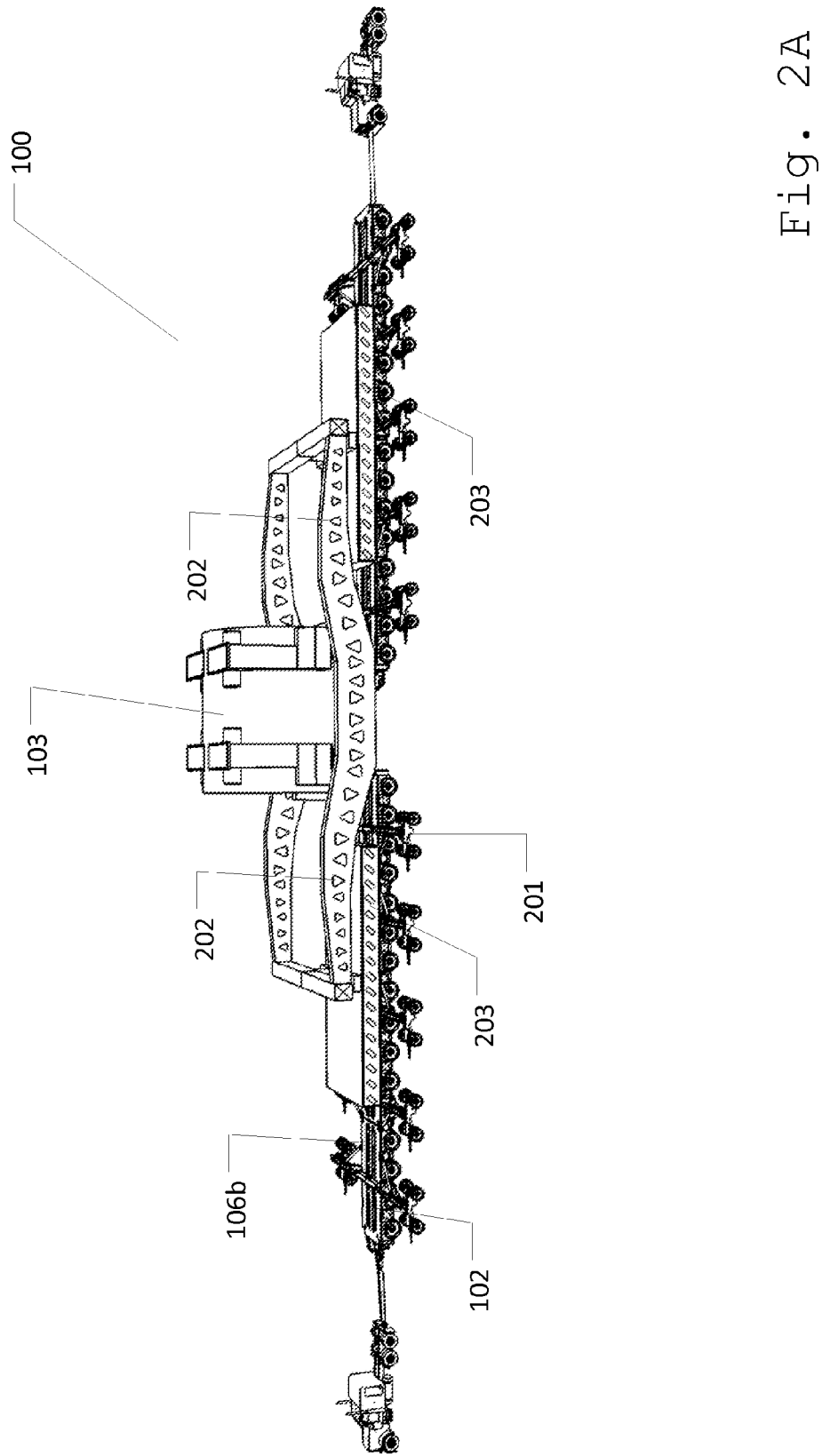
FIG. 2A illustrates a side view of a dolly-transport system comprising a wheeled center support.

FIG. 2A illustrates a side view of dolly-transport system 100 comprising a wheeled center support 106b. In one embodiment, wheeled center support 106b can be a powered or motored vehicle to carry load 103. One example of a wheeled center support 106b is a Goldhofer trailer. For purposes of this disclosure, wheeled center support 106b can be any trailer variant that are commonly used to transport agricultural machines, construction equipment, and/or any over-sized structures. Various type of wheeled center support 106b can be used with dolly-transport trailer system 100. Types of wheeled center support 106b can differ in terms of tires, load-bearing capacity, dimension and the suspension of the axle units.

Each wheeled center support 106b can comprise a plurality of trailer wheels 201. Trailer wheels 201 aid in carrying over-sized cargo since mass of load 103 are distributed throughout trailer wheels 201. Trailer 102 can allow load 103 to be carried at a minimum traveling height through suspending load 103 using a load support 202 and one or more load spreader 203. As a non-limiting example, dolly-transport system 100 can carry load 103 that has a weight of up to 367.7 Te or 810,746 lbs. In one configuration, a load support 202 can support load 103. Load spreaders 203 can together distribute the weight of load 103 across dolly transport system 100, ensuring that exceeding designed stress limit is avoided.

In one embodiment, both ends of load support 202 can be attached at the middle section of load spreader 203 using a girder plate 204. Girder plate 204 can attach load support 202 and load spreader 203. Load spreader 203 can be installed relatively at the middle portion of trailer 102. As such, both ends of load support 202 are in parallel with dollies 104 that are attached at the middle section of trailers 102. As a non-limiting example the overall length of load support 202 can be up to 133 ft. The overall length of dolly-transport system 100 in such embodiment can be up to 307 ft. in length.

Figure 2B:
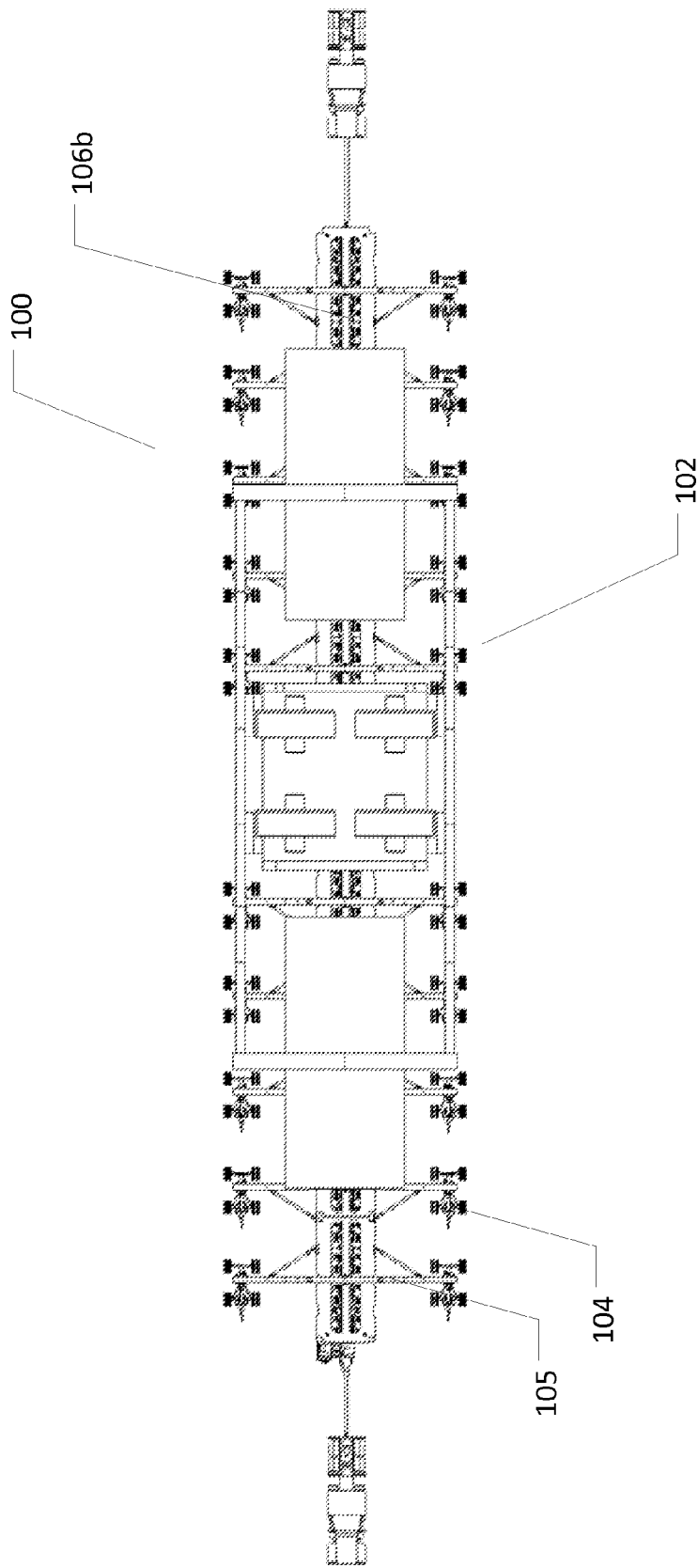
FIG. 2B illustrates a top view of a dolly-transport system comprising a wheeled center support.

FIG. 2B illustrates a top view of dolly-transport system 100 comprising a wheeled center support 106b. Dollies 104 and swing arms 105 can be attached to center support 106b. As a non-limiting example, dollies 104 can be equally distributed at the opposite sides of each trailer 102 wherein, and in one embodiment, the distance between the mid-sections of each dolly 104 can be 19 ft. Equal distribution ensures that weight is equally distributed among dollies 104 and balance is maintained.

FIG. 2C illustrates a rear view of dolly-transport system 100 comprising a wheeled center support 106b. Load 103 can be suspended in between load support 201 which allows load 103 closer to the ground and therefore minimizing the height of dolly-transport system 100.

Figure 3A:
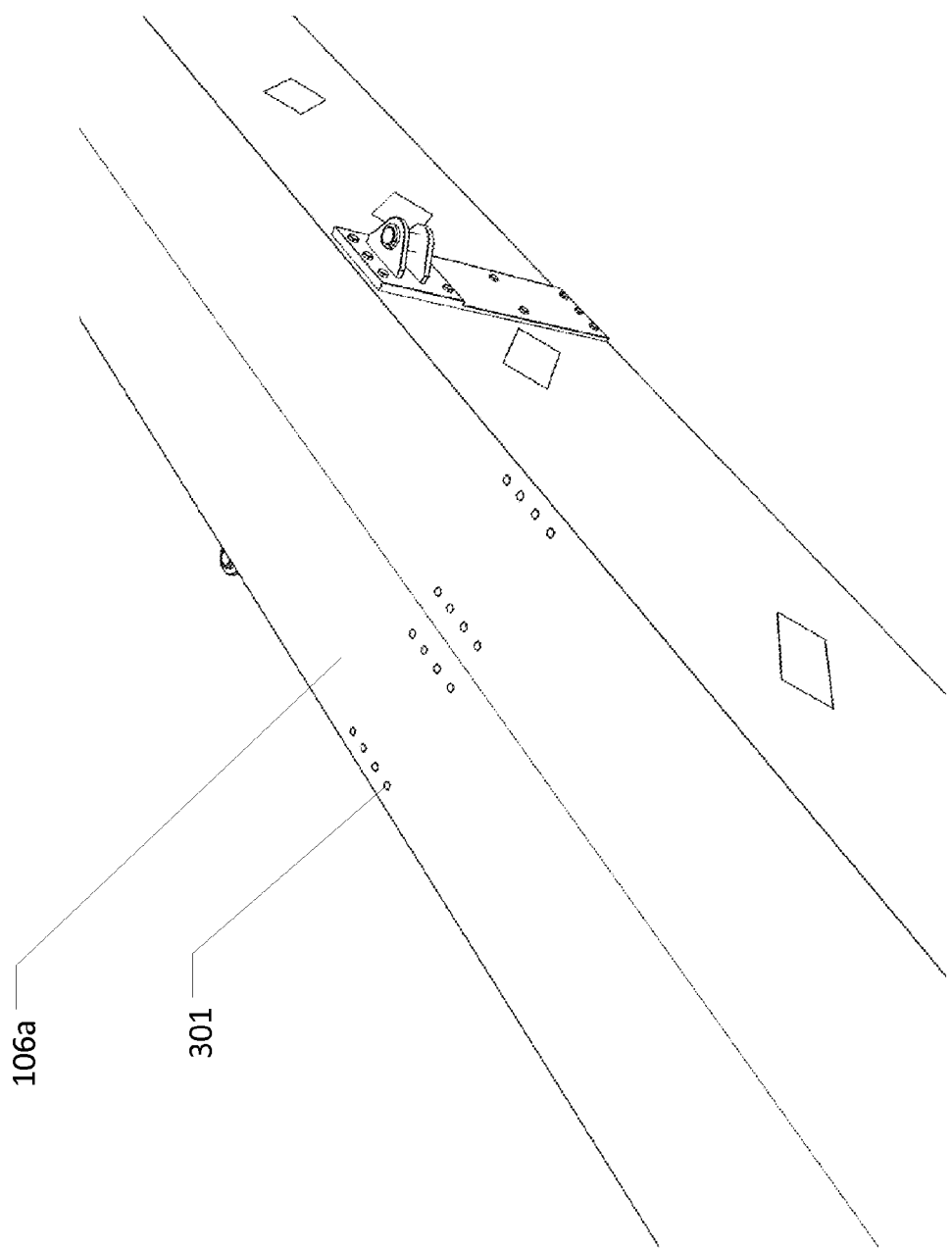
FIG. 3A illustrates a top view of a center support.

FIG. 3A illustrates a top view of center support 106a. In one embodiment, center support 106a can comprise a plurality of fastener holes 301. Fastener holes 301 can be the perforations made at the top and bottom surface of trailer 102.

Figure 3B:
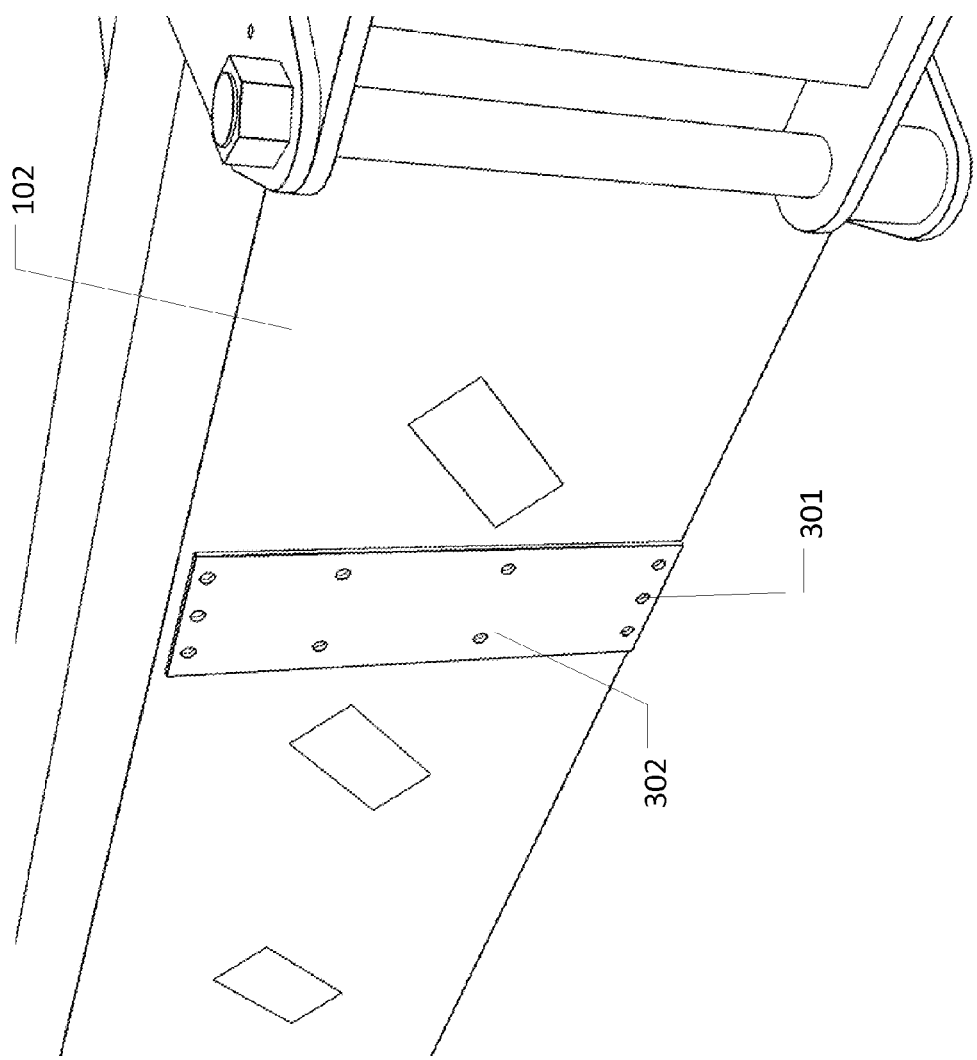
FIG. 3B illustrates a side view of a center support.

FIG. 3B illustrates a side view of center support 106a. Center support 106a can further comprise a plurality of side wall 302. Side wall 302 can be a device that serve as a point of connection for an equipment or another device. Side wall 302 can comprise a plurality of fastener holes 301 that can be used to fasten a device or equipment at the sides of trailer 102.

FIG. 4A illustrates a top view of wheeled center support 106b. In one embodiment, the top portion of wheeled center support 106b can comprise a predominantly flat surface.

Figure 4B:
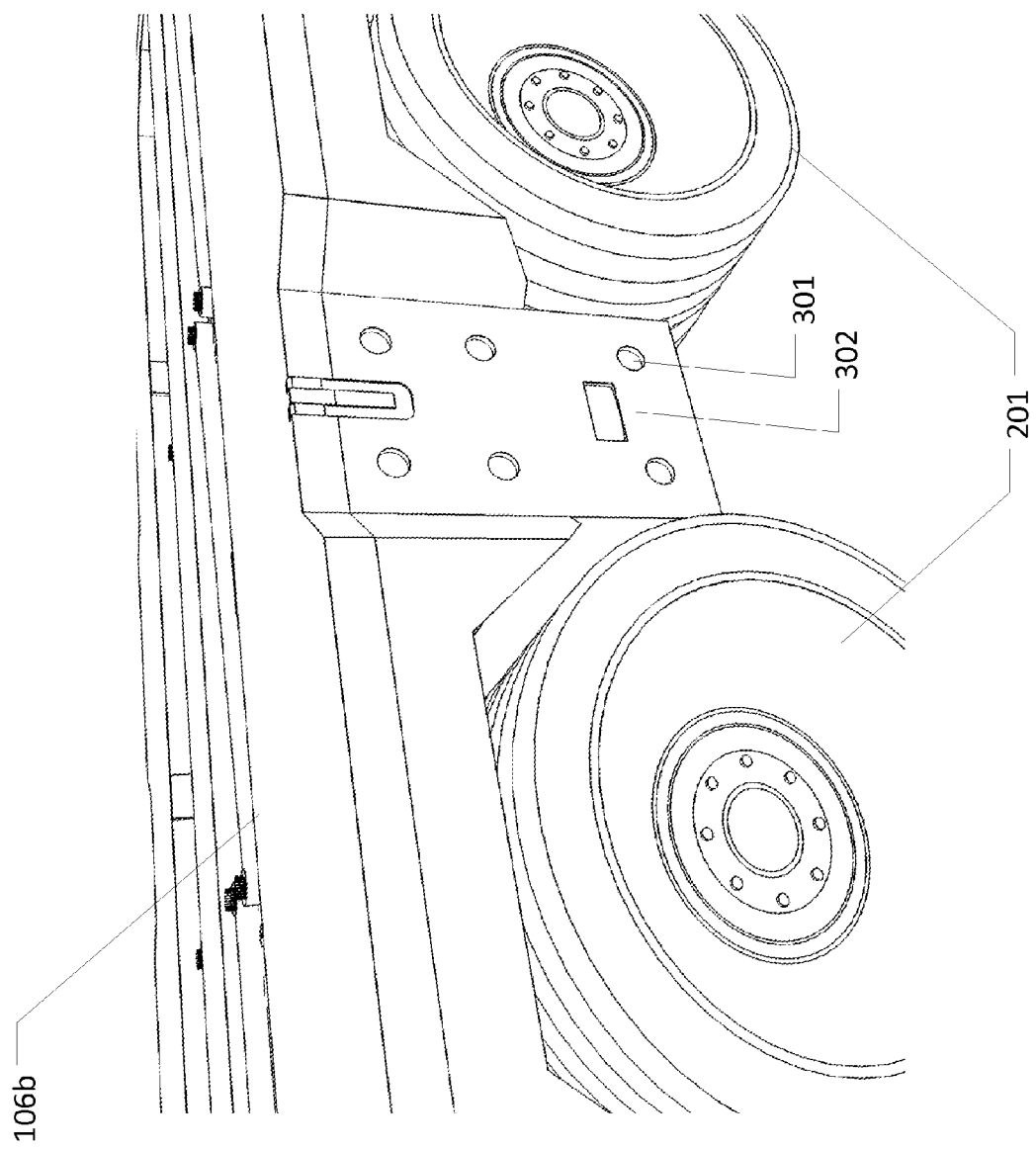
FIG. 4B illustrates a side view of a wheeled center support comprising a side wall.

FIG. 4B illustrates a side view of wheeled center support 106b comprising a side wall 302. In this embodiment, side wall can be continuous or intermittent along each side of wheeled center support 106b. In one embodiment, side walls 302 can be positioned in between trailer wheels 201 and comprises fastener holes 301.

FIGS. 5A and 5B illustrate a fixed support 500. Fixed support 500 can be any device that serves as a connection point between two pieces of equipment. Fixed support 500 can be made of durable material such as metal. In one embodiment, fixed support 500 can comprise a back plate 501, a pin guide 502 attached to back plate 501, and a support pin 503. Support pin 503 can be, but is not limited to, a pin or bolt. Pin guide 502 can comprise a pin guide orifice 504. Back plate 501 can be a flat sheet structure and can comprise a plurality of fastener holes 301. Fastener holes 301 can be the perforations made at the surface of back plate 501. Pin guide 502 can be a protruding member perpendicularly extending from back plate 501.

In one embodiment, fixed support 500 can be permanently fixed into the sides of trailer 102. In such embodiment fixed support 500 can be attached to trailer 102 through welding, soldering, cementing or use of other adhesives. In another embodiment, fixed support 500 can be detachable from the sides of trailer 102. As such, fixed support 500 can be removed and/or attached to trailer 102

FIG. 5B illustrates a top view of fixed support 500 further comprising a pin guide orifice 504. Pin guide orifice 504 can be a hollow cavity at the center of pin guide 502.

FIG. 6 illustrates a peripheral view of swing arm 105 and stabilizer rod 600. Swing arm 105 can comprise an arm 601. Arm 601 can comprise a track 602. In one embodiment, track 602 can be the protruding edges across the bottom of swing arm 105. Track 602 can comprise a plurality of guide holes 603. Guide holes 603 can be perforations placed across the surface of track 602. As a non-limiting example, the distance between each guide holes 603 can be six inches apart. Dolly 104 can mount to arm 602. Swing arm 105 can further comprise an arm hinge 604. A second fixed support 500 can connect to swing arm 105. In one embodiment, swing arms 105 can be at a fixed 90 degrees angle from trailer 102. In another embodiment, swing arms 105 can be configured to rotate at 90 degrees angle from an axis. As such swing arms 105 can fold to the sides of trailer 102 that can minimize the width of trailer 102.

Figure 7:
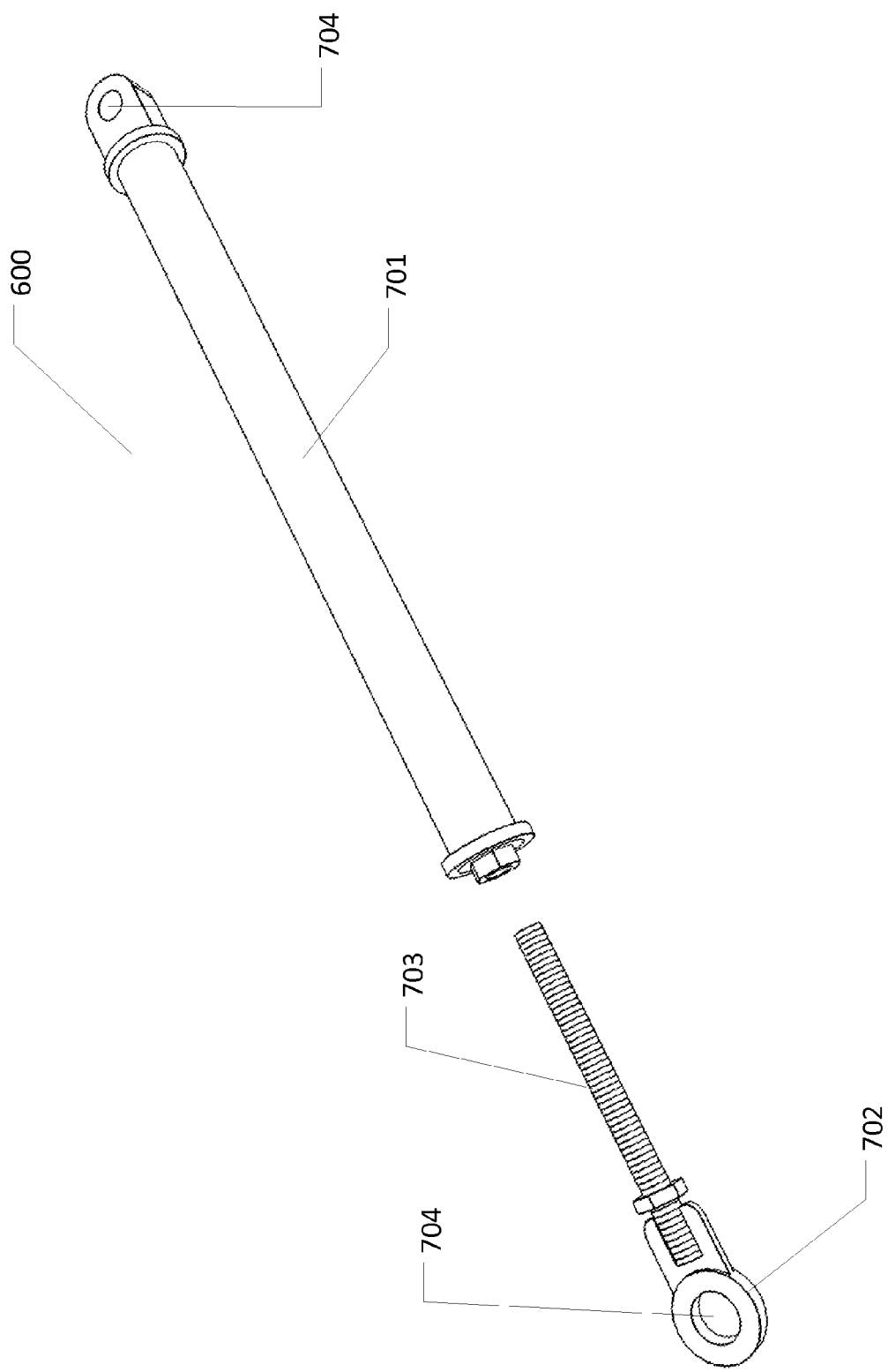
FIG. 7 illustrates a stabilizer rod.

FIG. 7 illustrates stabilizer rod 600. In one embodiment, stabilizer rod 600 can be extendable and retractable. As a non-limiting example, stabilizer rod 600 can comprise a first rod portion 701 and a second rod portion 702, one retractable within the other, with a locking mechanism 703. In one embodiment, first rod portion 701 and second rod portion 702 can be cylinders, one slightly smaller than the other. In another embodiment, one of rod portions 701 and 702 can be a bolt and the other can receive the bolt. In such embodiment, locking mechanism 703 can be interlocking threads on first rod portion 701 and second rod portion 703. In another embodiment, locking mechanism 703 can be a pin that passes through first rod portion 701 and second rod portion 702. On each end of stabilizer rod 600 can be a connector 704 that can connect with fixed supports 500. In one embodiment, support pin 503 can fix stabilizer rod 600 to fixed support 500. As such, by connecting stabilizer rod 600 to swing arm 105 and center support 106, swing arm 105 can be locked into place. In a preferred method of operation of system, swing arm 105 can be locked into a 90 degree angle, giving swing arm 105 its widest reach. By changing the length of stabilizer rod 600, the angle of swing arm 105 can be changed.

Figure 8A:
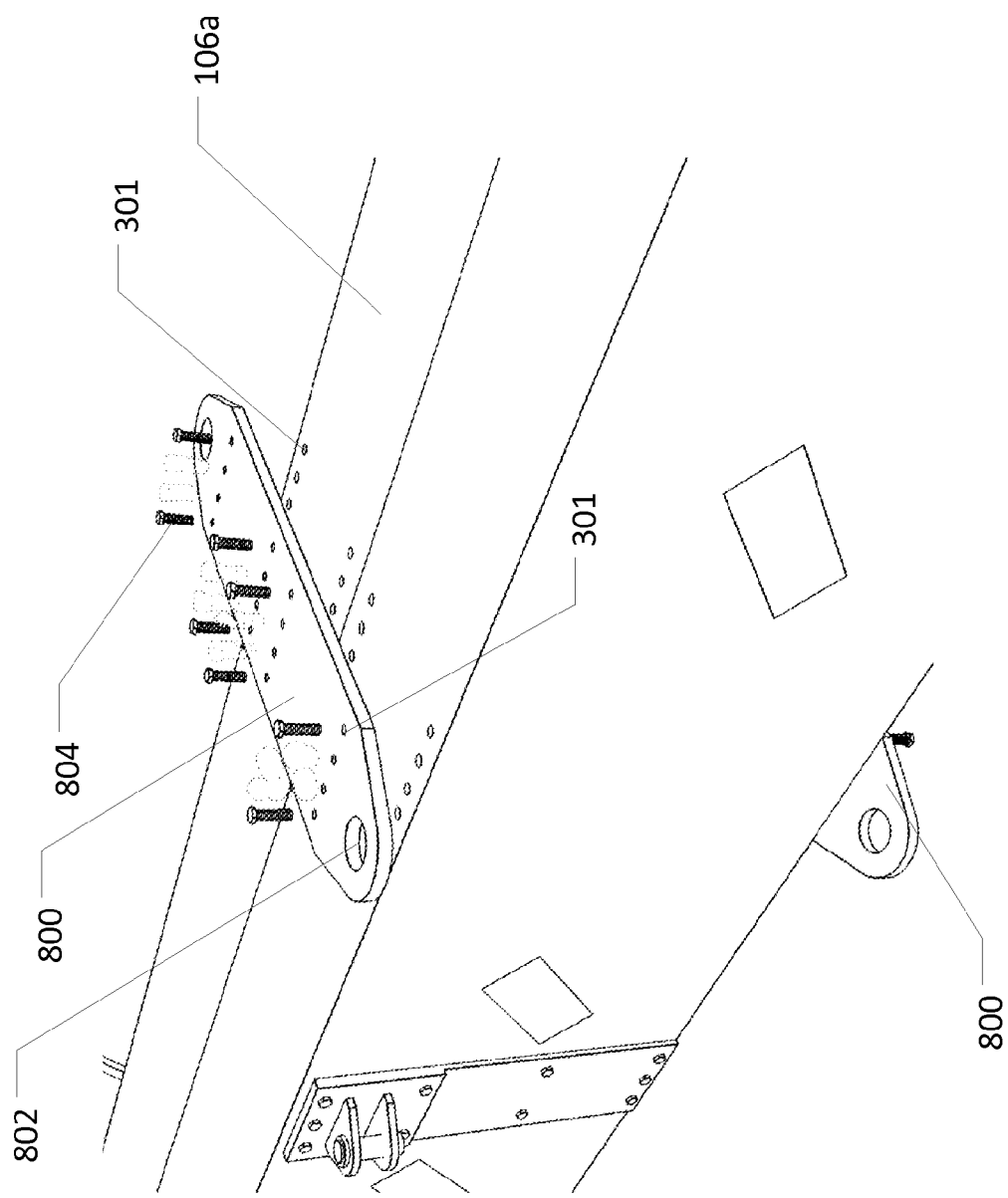

FIGS. 8A and 8B illustrates an embodiment of a frame 800. Frame 800 can be a device that is used to attach swing arm 105 to center support 106a. Frame 800 can be made of durable material, including metal or metal alloy such as steel. Frame 800 can be a flat metal structure mounted to the top and bottom of center support 106a. This would then align fastener holes 301 of center support 106a and frame 800. A fastening device such as screws, nails, nuts, and bolts can then be used to affix frames 800 with center support 106a. In one embodiment frames 800 can be permanently fixed to center support 106a through soldering, welding, or cementing. In another embodiment, frames 800 can be detachable from center support 106a. In such embodiment, frame 800 can comprise a plurality of fastener holes 301, and a pair of hinge interfaces 802. Fastener holes 301 can be distributed at a portion of frame 800 in contact with center support 106. One or more fasteners 804 can connect frame 800 to center support 106a. Hinge interface 802 can be at the extended opposite ends of frame 800. Hinge interface 802 can be an opening that interfaces with arm hinge 604. In such embodiments, the circumference of hinge interfaces 802 can be similar or compatible with arm hinge 604. In one embodiment, as shown in FIG. 8B, a hinge pin 803 can then be inserted as a portion of arm hinge 604 to connect swing arm 105 to frame 800. Further, stabilizer rod 600 can be connected with fixed support 500 by inserting connector 704 between pin guide 502. The perforation in connectors 704 can then be aligned with pin guide orifice 504.

Figure 9A:
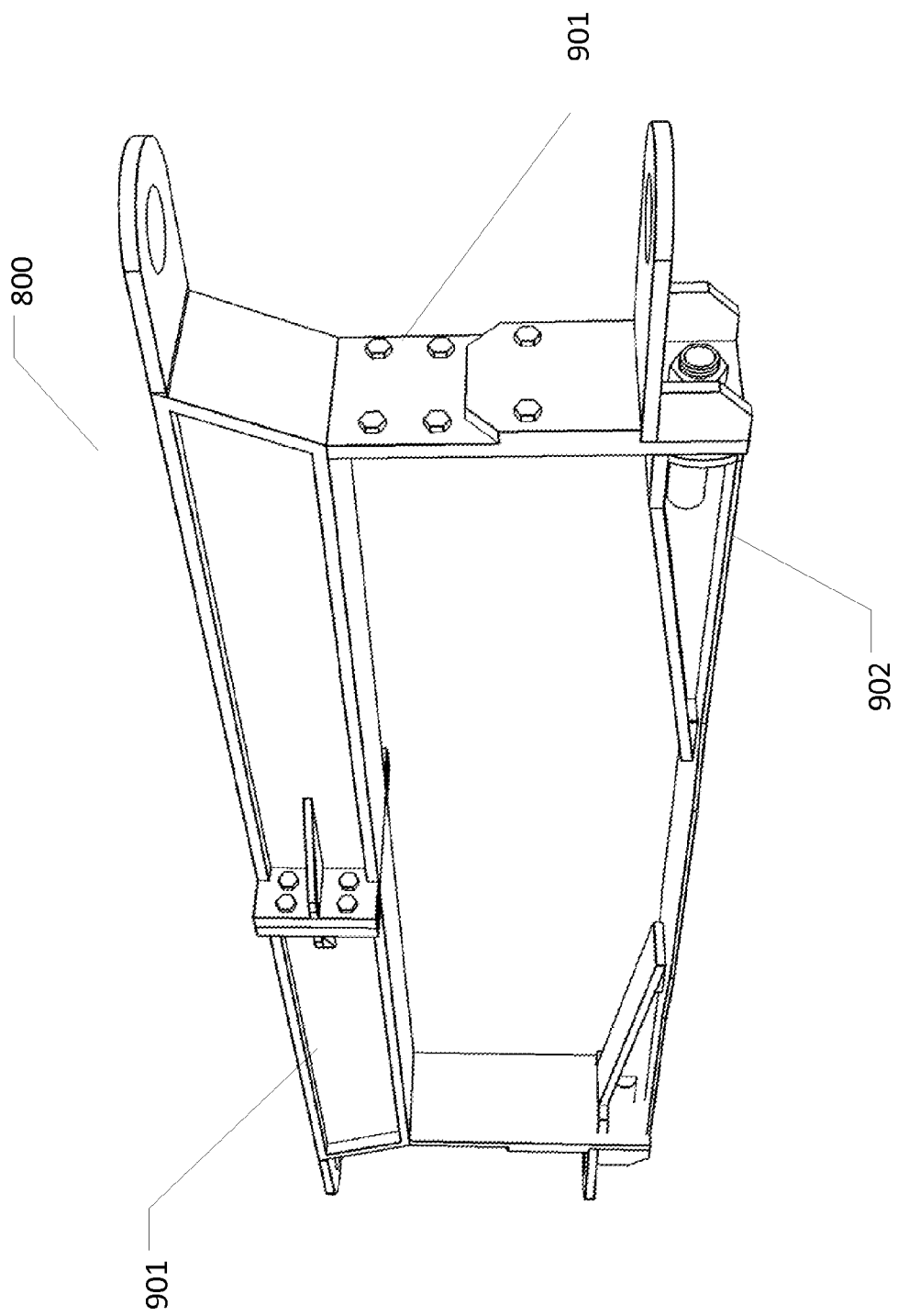
FIG. 9A illustrates another embodiment of a frame for a center support.

FIG. 9A illustrates another embodiment of frame 800 for center support 106b. In this embodiment, frame 800 can comprise a pair of top frames 901 and a bottom frame 902. Top frames 901 and bottom frame 902 can be put together to mount around trailer 102.

Figure 9B:
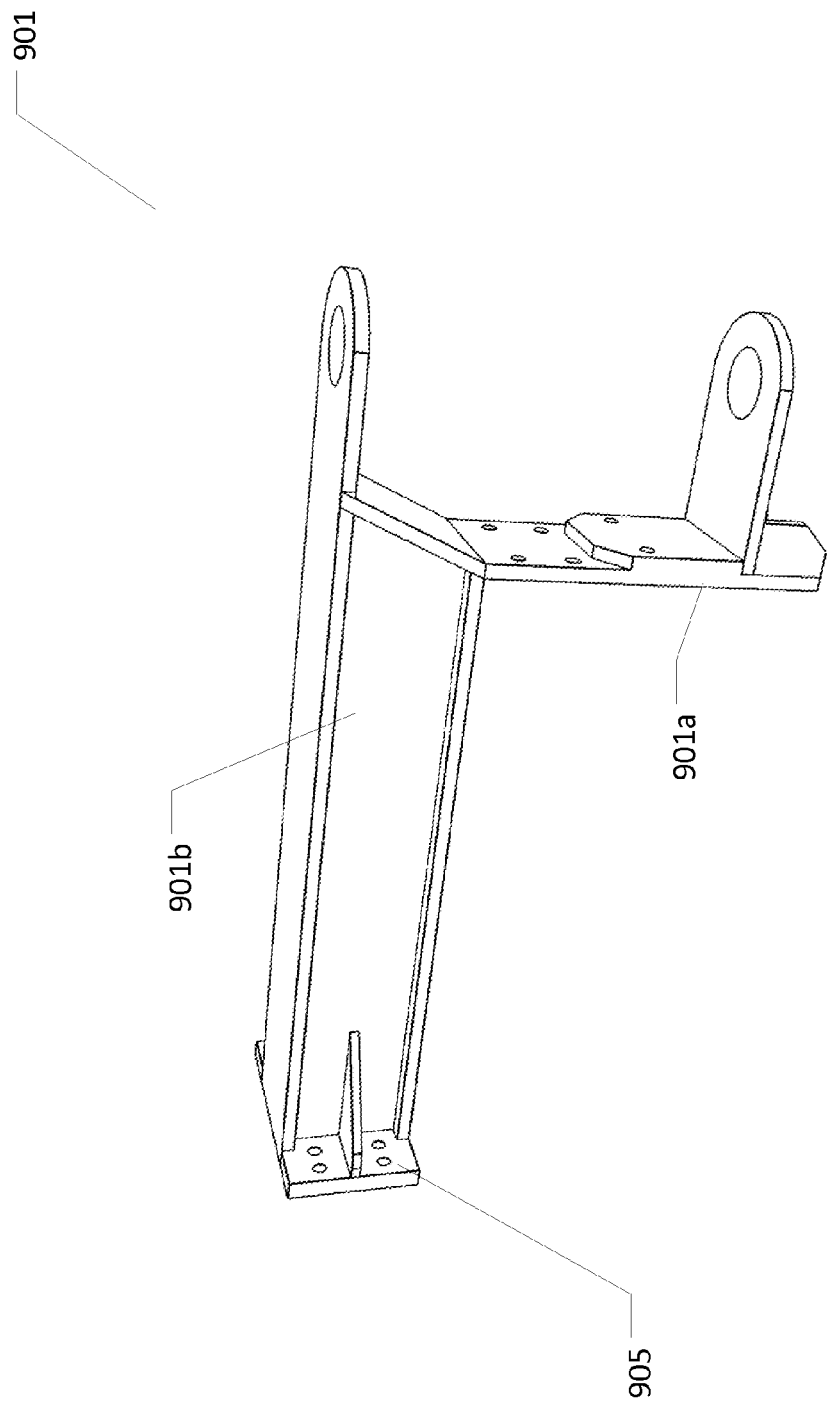
FIG. 9B illustrates a side view of a top frame.

FIG. 9B illustrates a side view of a top frame 901. Top frame 901 can be an L-shape structure comprising a flat beam 901a and an I-beam 90 1b. Flat beam 901a can be the part of top frame 901 that rests at the side of center support 106b. Rectangular beam 901b can be the portion of top frame 901 that mounts at the top surface of center support 106b.

FIG. 9C illustrates a front view of flat beam 901a. Flat beam 901a can comprise fastener holes 301, hinge interfaces 802 and a bottom frame hole 903. Fastener holes 301 in this embodiment can be placed at the middle section of flat beam 901a while hinge interfaces 802 can be placed at a pair of extended members 904. Extended members 904 can be a protruding part of flat beam 901a that are attached perpendicularly at the opposite ends of flat beam 901a. Bottom frame hole 903 can be an orifice placed at the outer end of flat beam 901a that is just below the bottom extended member 904b.

FIG. 9D illustrates a front view of joint 905. Joints 905 can connect each of top frames 901 together. In one embodiment, joint 905 can comprise a plurality of joint holes 906. Joint holes 906 can be the perforations at the surface area of joint 905. Fasteners can pass through joint holes to join top frames 901.

Figure 9E:
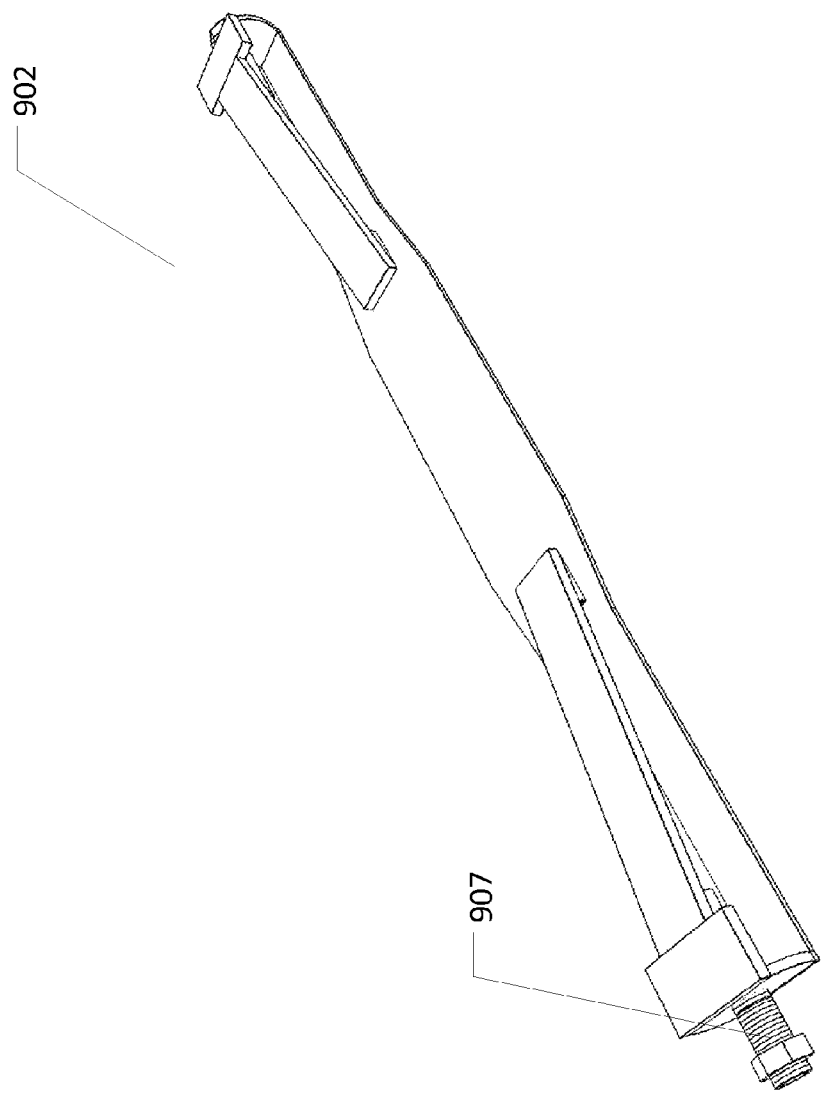
FIG. 9E illustrates a bottom frame.

FIG. 9E illustrates a bottom frame 902. Bottom frame 902 can be a long beam comprising a pair of threaded rods 907 at the opposite ends. Moreover, bottom frame 902 can have a trapezium structure at both ends that can form a long and flat sheet structure at the bottom of center support 106b.

FIG. 9F illustrates an assembled frame 800 around center support 106b. Two pieces of top frame 901 can be connected together forming a U-shape structure. These top frames 901 can be attached together at joint 905, wherein joint holes 906 of each top frame 901 can be aligned and be fastened together through a fastening device such as screws, nuts and bolts. Once top frames 901 are affixed together, top frames 901 can be mounted at the top surface of center support 106b where side wall 302 are located. This allows flat beam 901a rest on top of side wall 302 therefore aligning fastener holes 301 of side wall 302 and top frame 901. Fasteners 804 can hold top frame 901 in place. Further, top frames 901 can be mounted around bottom frame 902 positioned at the bottom surface of center support 106b. Bottom frame 902 can be connected with top frames 901 by inserting threaded rods 907 into the bottom frame holes 903 of top frames 901. A fastener such as bolts and washers can be used to close or lock bottom frame 902 into top frames 901.

Figure 9G:
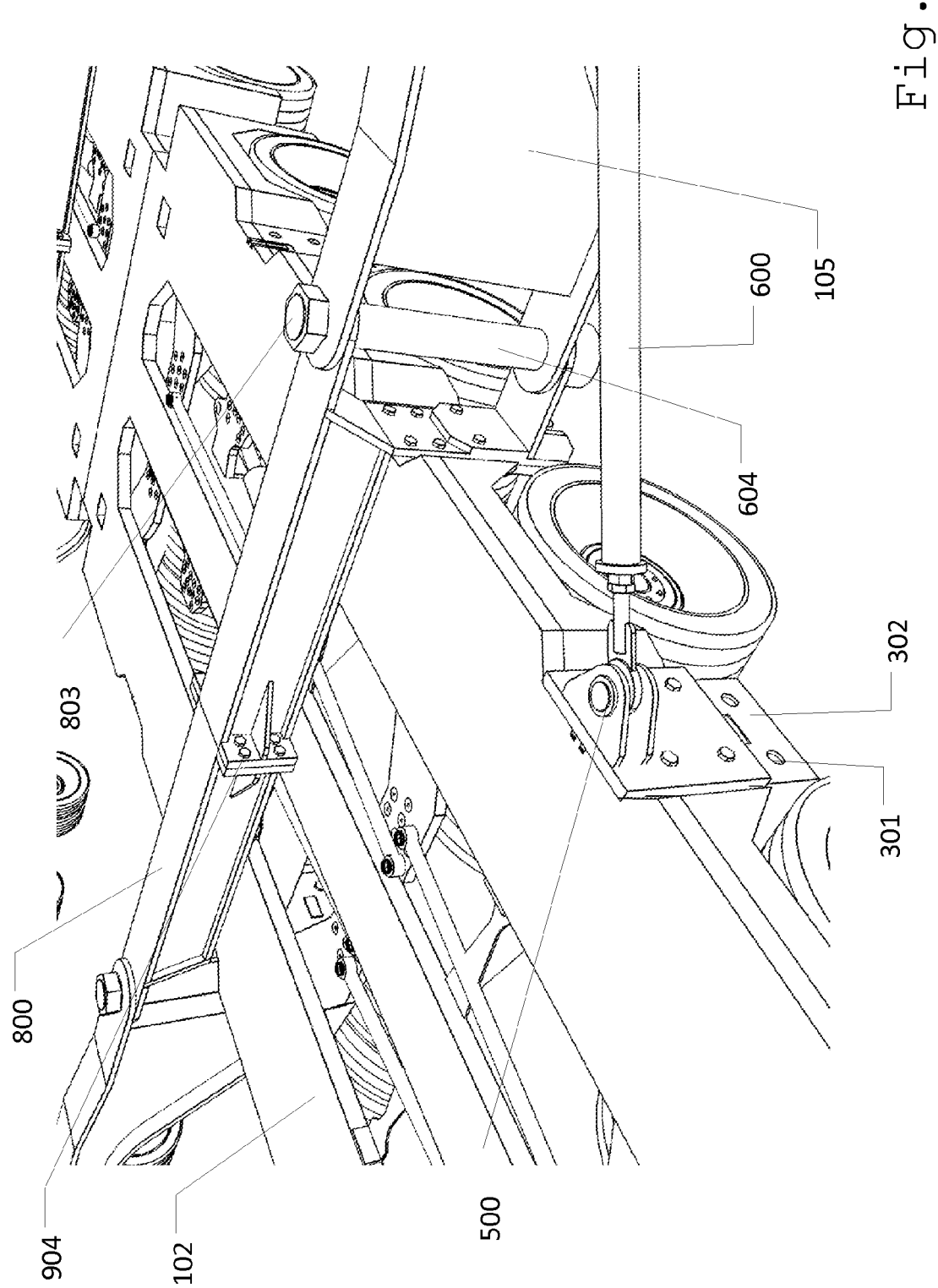
FIG. 9G illustrates a frame embodiment and a pair of swing arms attached to a wheeled center support.

FIG. 9G illustrates how a frame 800 embodiment and swing arms 105 be attached to wheeled center support 106b. After frame 800 is connected with trailer 102, swing arms 105 can be attached to frame 800 by positioning arm hinge 604 between extended members 904. Pin 803 can hold swing arm 105 and frame 800 together therefore securing swing arms 105 in place. Further in this trailer 102 embodiment, side wall 302 can also be used as a junction for stabilizer rod 600 and center support 106a. Fixed support 500 can be attached into side wall 302 by matching fastener holes 301 between fixed support 500 and side wall 302, and attaching them together with fasteners 804. In such arrangement, one end of stabilizer rod 600 can be connected to fixed support 500 through fastening first connector 704 and pin guide orifice 504 together. Simultaneously, second connector 704 can then be fastened with arm hinge 604. Stabilizer rod 600 can be attached to swing arms 105 by connecting second connector 704 with arm hinge 604. In one embodiment, swing arm 105 can be securely fixed to trailer 102 through welding, soldering, cementing or use of other adhesives. As such, swing arm 105 can be immobile and unable to swing on different directions. In another embodiment, swing arm 105 can be fastened to trailer 102 through a fastening device such as a hinge, screw, nuts and/or bolts.

Figure 10:
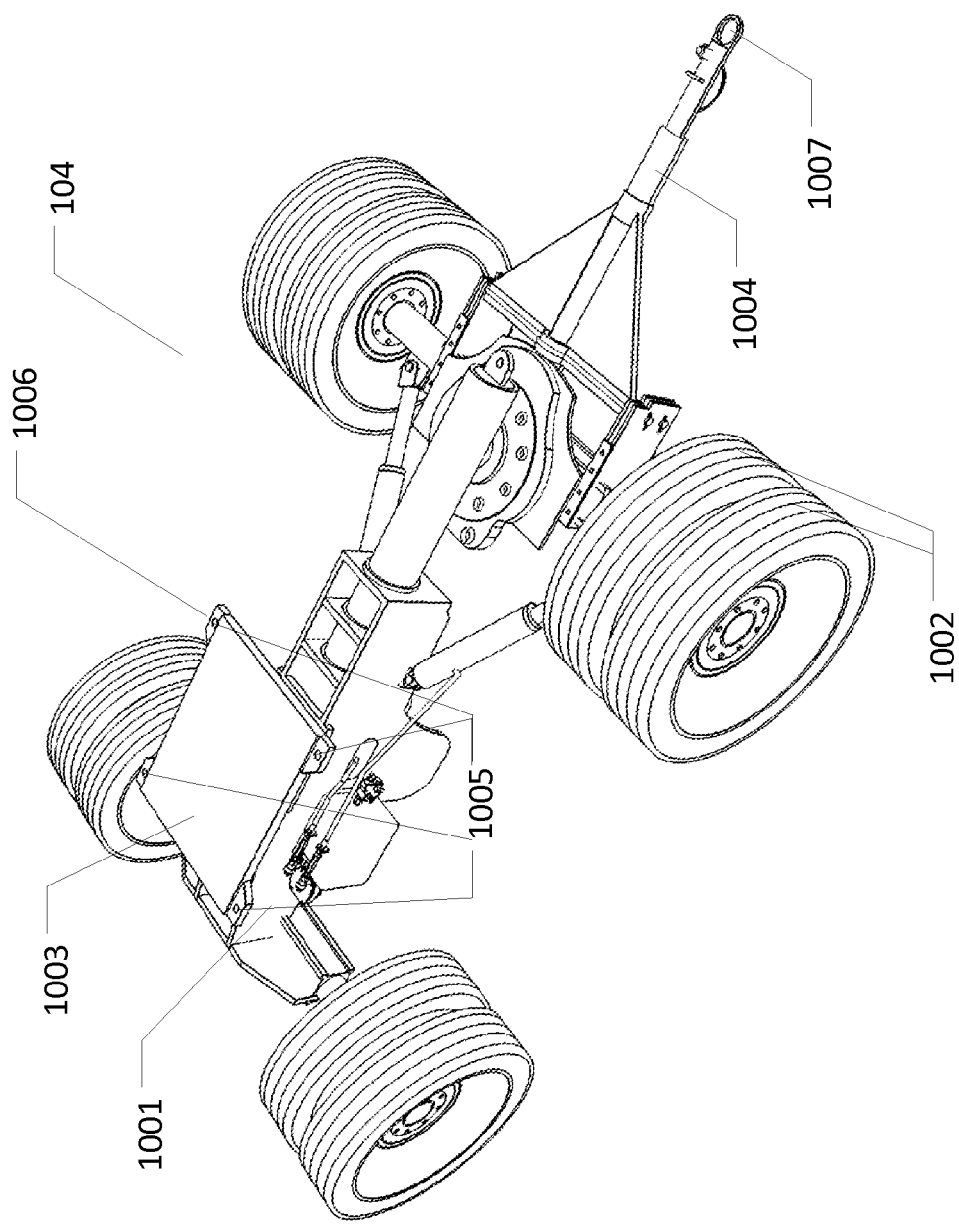
FIG. 10 illustrates a dolly comprising mainly of a body, a plurality of dolly-wheels, a platform, and/or a draw bar.

FIG. 10 illustrates a dolly 104 comprising mainly of a body 1001, a plurality of dolly-wheels 1002, a platform 1003 and/or a draw bar 1004. Body 1001 can be the main structure that support and hold the dolly-wheels 1002, platform 1003, and draw bar 1004 together. Body 1001 can be a structure made of rigid materials that include but are not limited to metal, steel, and wood. In one embodiment, platform 1003 can be a metal plate attached at the top portion of body 1001 using a swivel connection, which can allow platform 1003 to rotate freely. Platform 1003 can be a flat square sheet that can be made of durable material such as metal or metal alloy such as steel. Platform 1003 can comprise a plurality of expanded corners 1005 and a plurality of platform orifices 1006. In one embodiment, expanded corners 1005 can be an extended portion at the corners of platform 1003. In one embodiment, platform 10003 can comprise platform orifices 1006. Draw bar 1004 can be a strong metal rod attached at the rear of dolly 104. Draw bar 1004 can be used for attaching another tool or machine with dolly 104. In one embodiment, draw bar 404 can comprise a ring 1007. Ring 1007 can be a circular structure comprising an orifice at the center.

Figure 11:
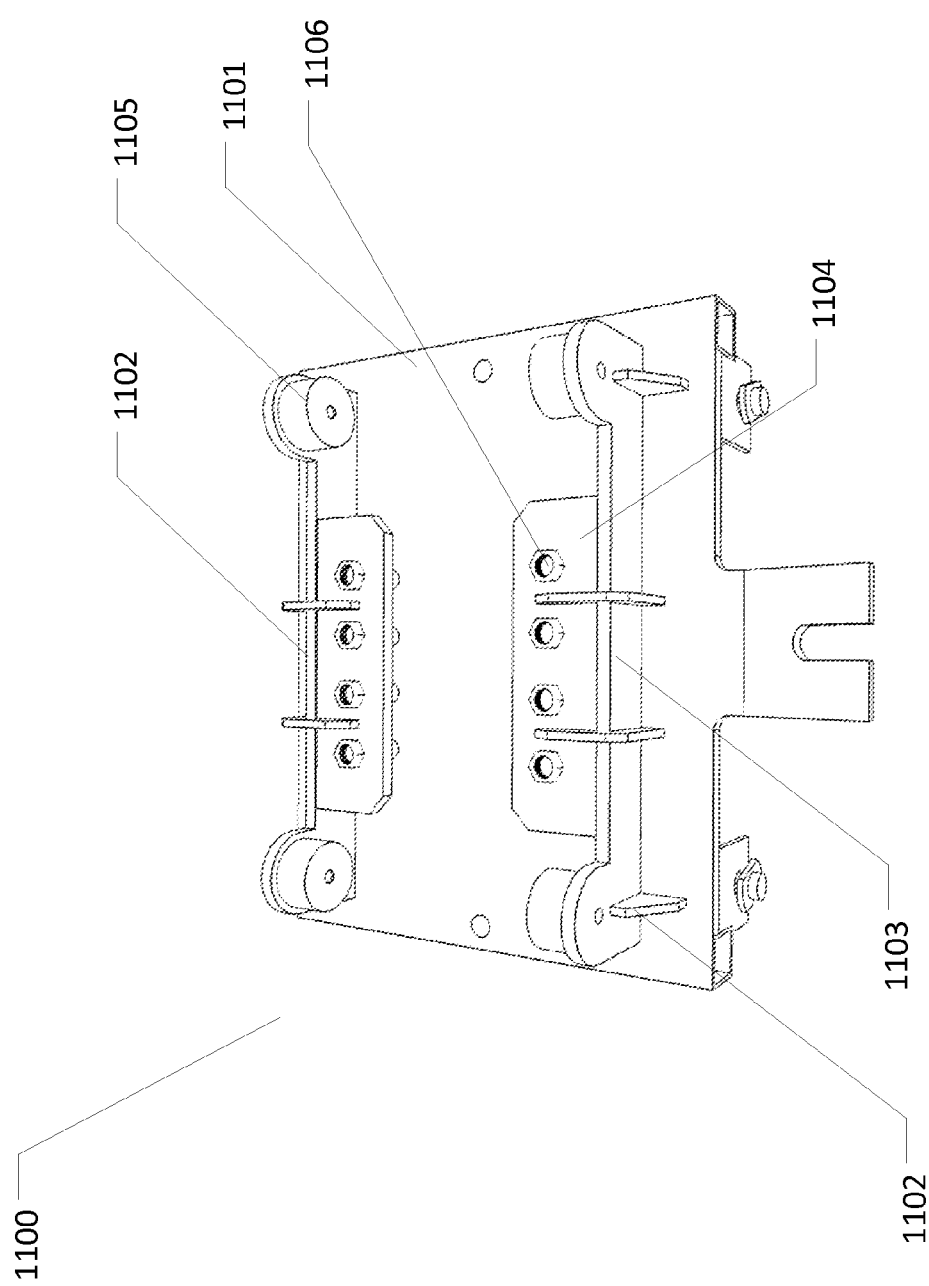
FIG. 11 illustrates the top surface of a sliding plate.

FIG. 11 illustrates the top surface of a sliding plate 1100. Sliding plate 1100 can be a substantially flat structure made of durable material such as metal or metal alloy. Sliding plate 1100 can comprise a plate 1101 and one or more plate guides 1102. As a non-limiting example, sliding plate 1100 can be 25.25 inches in length and 21.5 inches in width.

Plate 1101 can be a flat body that serves as a base structure for sliding plate 1100. Plate guide 1102 can mate with track 602, allowing sliding plate 1100 to slide along swing arm 105. In one embodiment, plate guide 1102 can comprise a raised portion 1103, a lip 1104 and/or a plurality of rollers 1105, to aid sliding.

In one embodiment, lip 1104 can be a flat rectangular plate, which expand towards the center and parallel to sliding plate 1100. In such embodiment, lip 1104 can be positioned in between rollers 1105. Plate guide 1102 can comprise a plurality of sockets 1106. In one embodiment, sockets 1106 can comprise internal threading that can allow socket 1106 be fastened with a threaded fastener. In one embodiment, one or more of the sockets 1106 can be placed on lips 1104. In a preferred embodiment, sockets 1106 can be positioned equidistant from one another, on each plate guide 1102. As a non-limiting example, distance between sockets 1106 on lip 1104 can be three inches apart.

Figure 12:
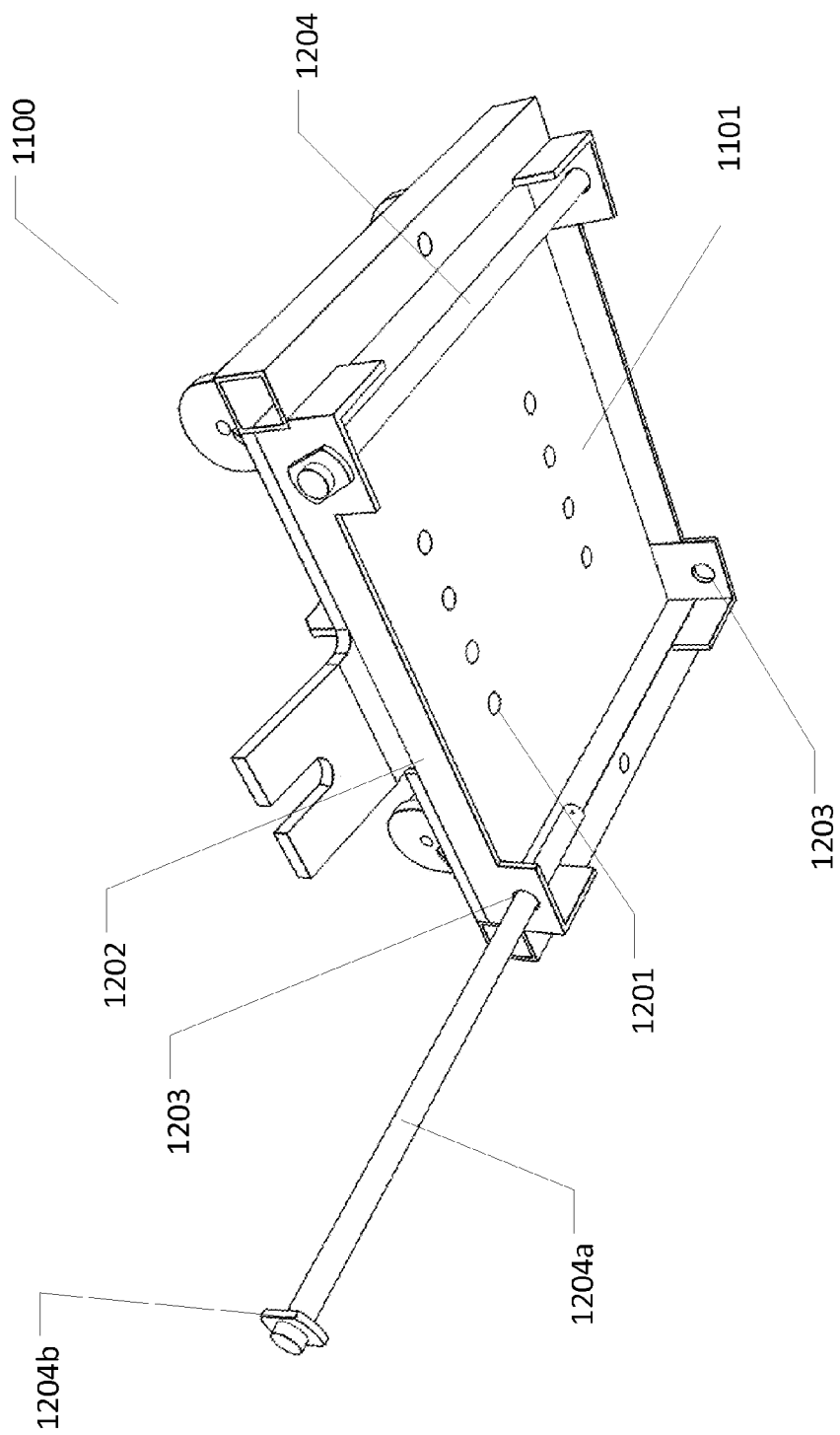
FIG. 12 illustrates the bottom surface of a sliding plate.

FIG. 12 illustrates the bottom surface of sliding plate 1100. Plate 1101 can comprise a plurality of plate holes 1201. The plate holes 1201 in plate 1101 can be positioned under sockets 1106. The bottom portion of plate 1100 can be held in contact with platform 1003 using a locking mechanism. In one embodiment, locking mechanism can be a pin lock system as shown in FIG. 12. In such embodiment, sliding plate 1100 can comprise a plurality of plate walls 1202 connected to plate 1101. Together, plate walls 1202 can form an enclosure that can snuggly contain platform 1003. In one embodiment, the effective enclosure formed by plate walls 1202 can have a rotational symmetry around a symmetry axis 1205 such that when sliding plate is rotated 180 degrees, sliding plate can still snugly enclose platform 1003. For example, in FIG. 12, the effective enclosure is a rectangle, matching platform 1003. If rotated 180 degrees, the effective enclosure would still be a rectangle matching platform 1003. Various plate walls 1202 can each comprise one or more slots 1203. Pairs of slots 1203 can be substantially in parallel with each other. After platform 1003 is placed within plate walls 1202, one or more pins 1204 can pass through pairs of slots, locking platform 1003 into place. Pin 1204 can be a device used for holding or locking a device in place. Pin 1204 can comprise a rod 1204a and a head 1204b connected to a first end of rod 1205. Head 1204b can prevent pin 1204 from falling out. After insertion, a removable and re-attachable second head 1204b or a cross pin can be connected to the second end of rodb1204a to keep both end in place.

Figure 13:
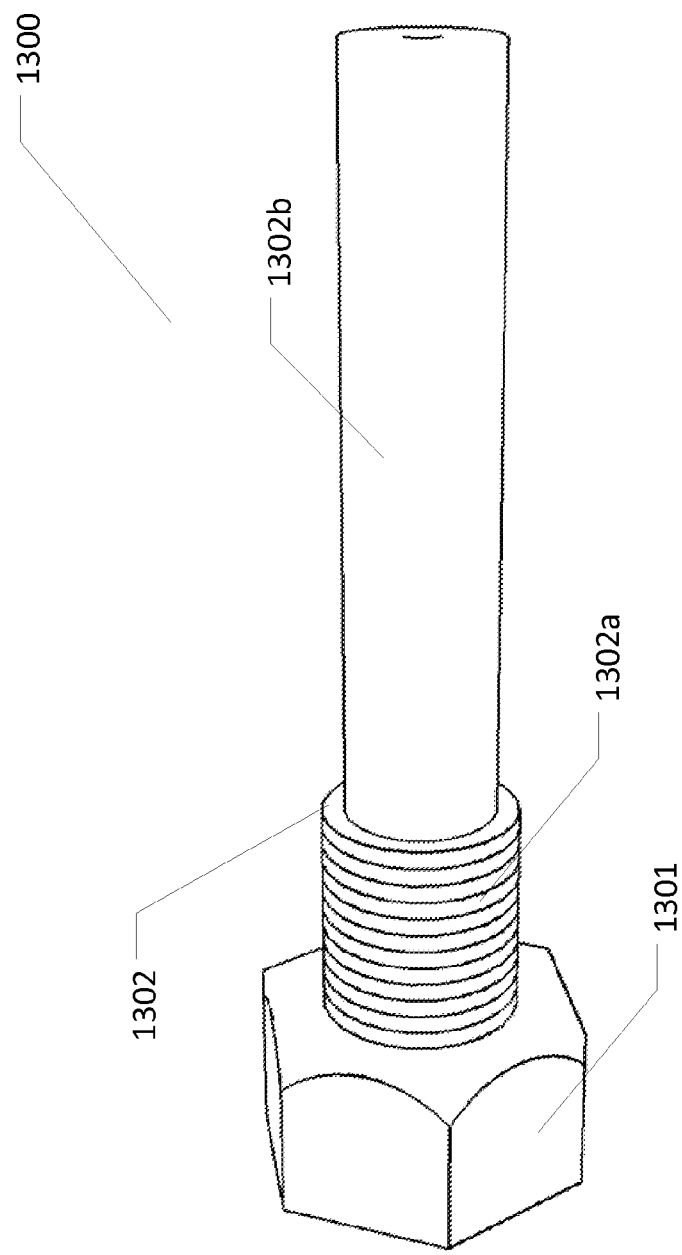
FIG. 13 illustrates a fastener comprising a fastener head, and a fastener shaft.

FIG. 13 illustrates a fastener 1300 comprising a fastener head 1301, and a fastener shaft 1302. Fastener 1300 can be a device that fastens swing arm 105 and sliding plate 1100 together. To do so, fastener 1300 can mate with sockets 1106 and guide holes 603. Fastener head 1301 can allow fastener 1300 to be turned or otherwise driven into sliding plate 1100 and swing arm 105. In one embodiment, shank 1302 can comprise a threaded portion 1302a and an unthreaded portion 1302b.

Figure 14A:
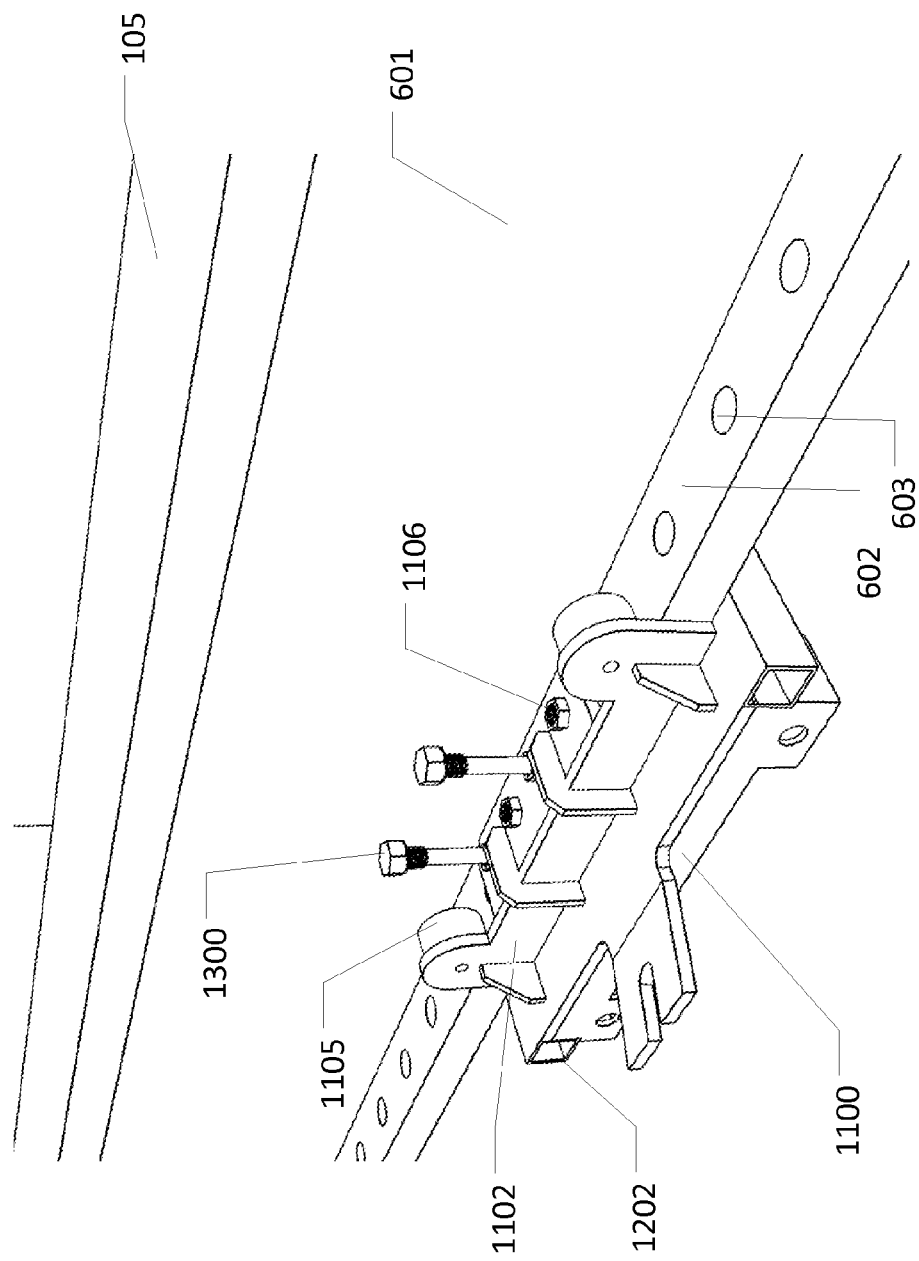
FIG. 14A illustrates a sliding plate mounted on a swing arm.

FIG. 14A illustrates sliding plate 1100 mounted on swing arms 105. In one embodiment, sliding plate 1100 can be positioned on track 602 between plate guides 1102, so that lip 1104 can rest on top of track 602. In such embodiment, rollers 1105 can sit on top surface of track 602 making sliding plate 1100 roll over swing arm 105 to a desired position. Sliding plate 1100 can be adjusted across arm 601 to align sockets 1106 of sliding plate 1100 with guide holes 603 of swing arm 105. Once aligned, sliding plate 1100 can be fastened with swing arm 105 one or more fasteners 1300. Fastener 1300 can then be inserted into the aligned sockets 1106 and guide holes 603. Unthreaded shank 1302b can slide past socket 1106, through plate 1101 and swing arm 105. Threaded portion 1302a can threads compatible with the internal threading of sockets 1106. As threaded portion 1302a screws in, sliding plate 1100 can become fixed to swing arm 105. In another embodiment, fastener can be completely threaded, or threaded partially at the far end to screw into plate 1101.

Figure 14B:
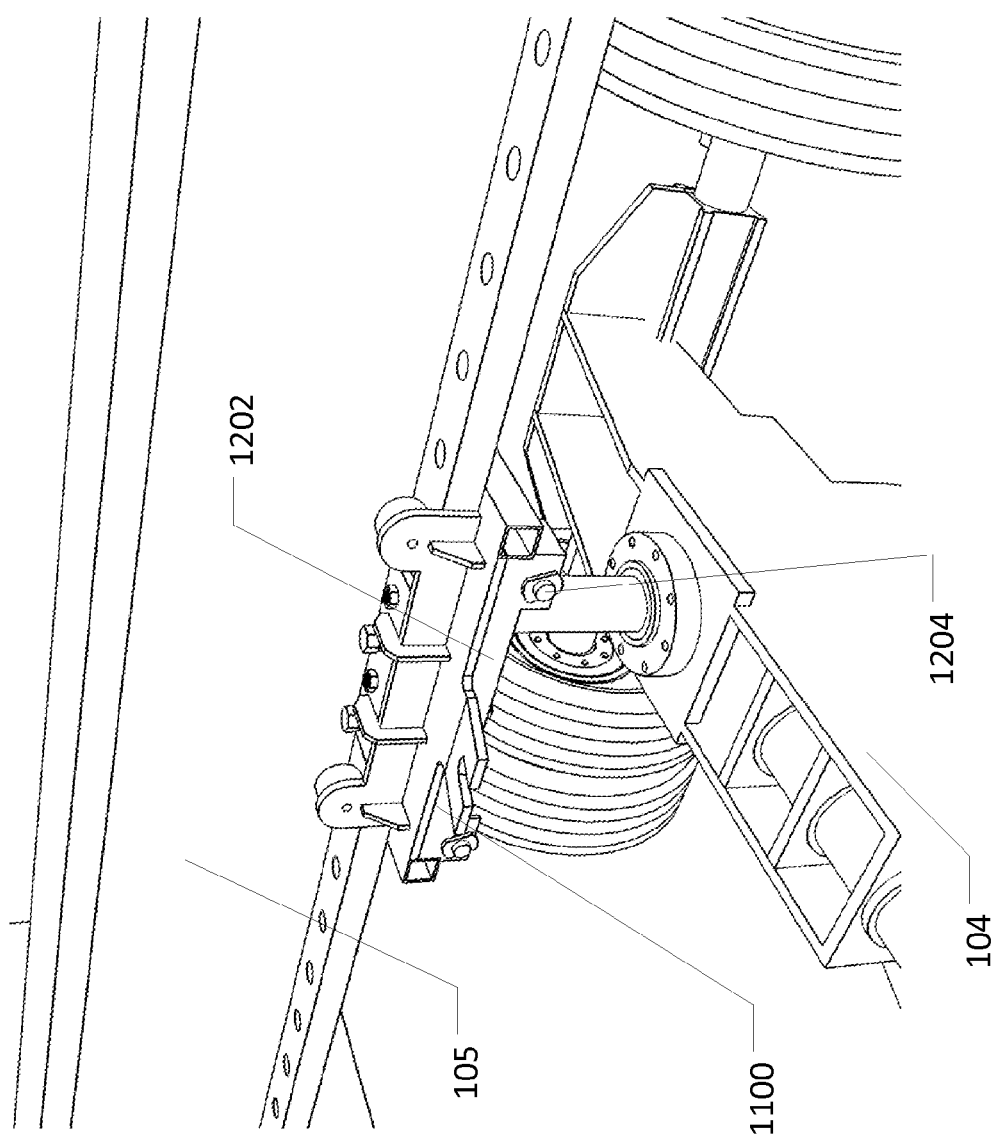
FIG. 14B illustrates a sliding plate connected with a dolly.

FIG. 14B illustrates sliding plate 1100 connected with dolly 104. After the top surface of sliding plate 1100 is mounted on swing arms 105, dolly 104 can be put in contact with the bottom surface of sliding plate 1100. In one embodiment, a thin padding can be placed between platform 1003 and sliding plate 1100. Once platform 1003 is attached to sliding plate 1100 one or more pins 1204 can be inserted onto slots 1203 to ensure that platform 1003 does not slide or fall out from sliding plate 1100. Moreover, plate walls 1202 can serve as a border on the opposite side of sliding plate 1100 that provides additional support to keep platform 1003 in place.

Figure 14C:
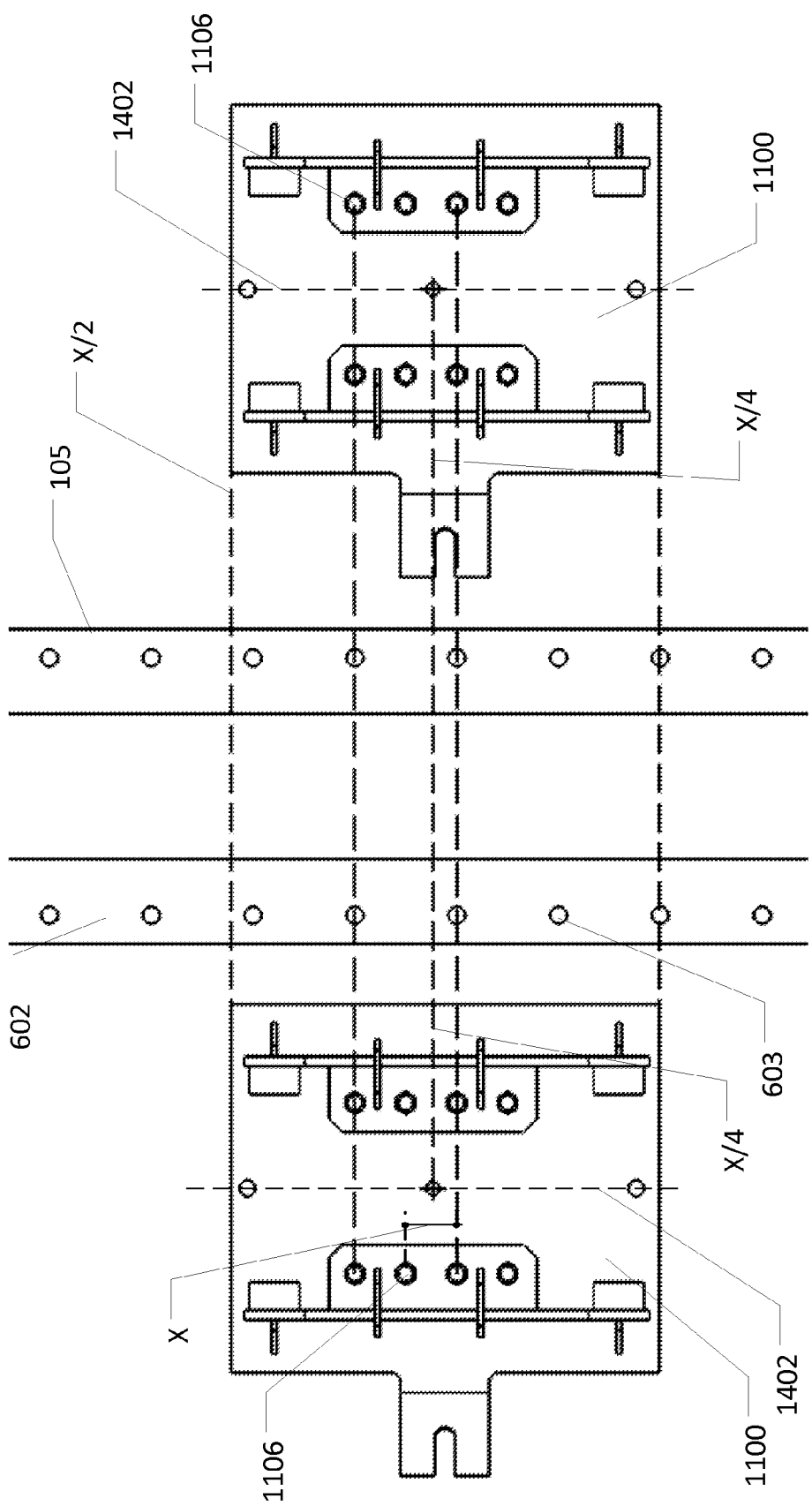
FIG. 14C illustrates an embodiment of a sliding plate wherein a sliding plate mounts in the same positions regardless of its mounting direction.

FIG. 14C illustrates an embodiment of sliding plate 1100 wherein sliding plate 1100 mounts in the same positions regardless of its mounting direction. In one embodiment, sliding plate 1100 can be mounted to swing arms 105 in two different directions. So that the vertical position of dolly 104 does not change when plate is rotated, plate guides 1102 can be placed parallel to each other, each an equal distance away from symmetry axis 1205. However, if two different vertical positions of dolly 104 are desired, symmetry axis can be positioned closer to one plate guide 1102 than the other.

By positioning a socket 1106 of plate guides 1102 such that it is (n*x)/2 away from a lateral line 1402 passing through symmetry axis 1205, where n is any integer, and x is the distance between two adjacent sockets 1106 on plate guide 1102, plate guide 1102 will be positionable at the same set of discrete points, x distance from each other, regardless of the direction plate guide 1102 slides onto swing arm 105. In a preferred embodiment, n=−1, 0, or 1, and the reference socket 1106 is a middle socket 1106. Further, to maintain a two-fastener connection on plate guide 1102 comprising four sockets 1106, guide holes 603 on swing arm 105 can be spaced 2*x apart. For example, if x is 3 inches, sliding plate 1100, then sliding plate 1100 will be positionable at discrete points on swing arm 105, the discrete points three inches apart. If sliding plate 1100 is removed from swing arm 105, rotated 180 degrees, and repositioned on swing arm 105, it will be positionable at the same discrete points. To maintain a two-fastener connection with plate guide 1102 in the example, guide holes 603 in swing arm 105 can be placed six inches apart. Such configuration of plate guide 1102 in FIG. 14C is beneficial because assembler of dolly-transport system 100 can assemble swing arm 105 and dolly 104 without considering the direct of sliding plate 1100.

Figure 14D:
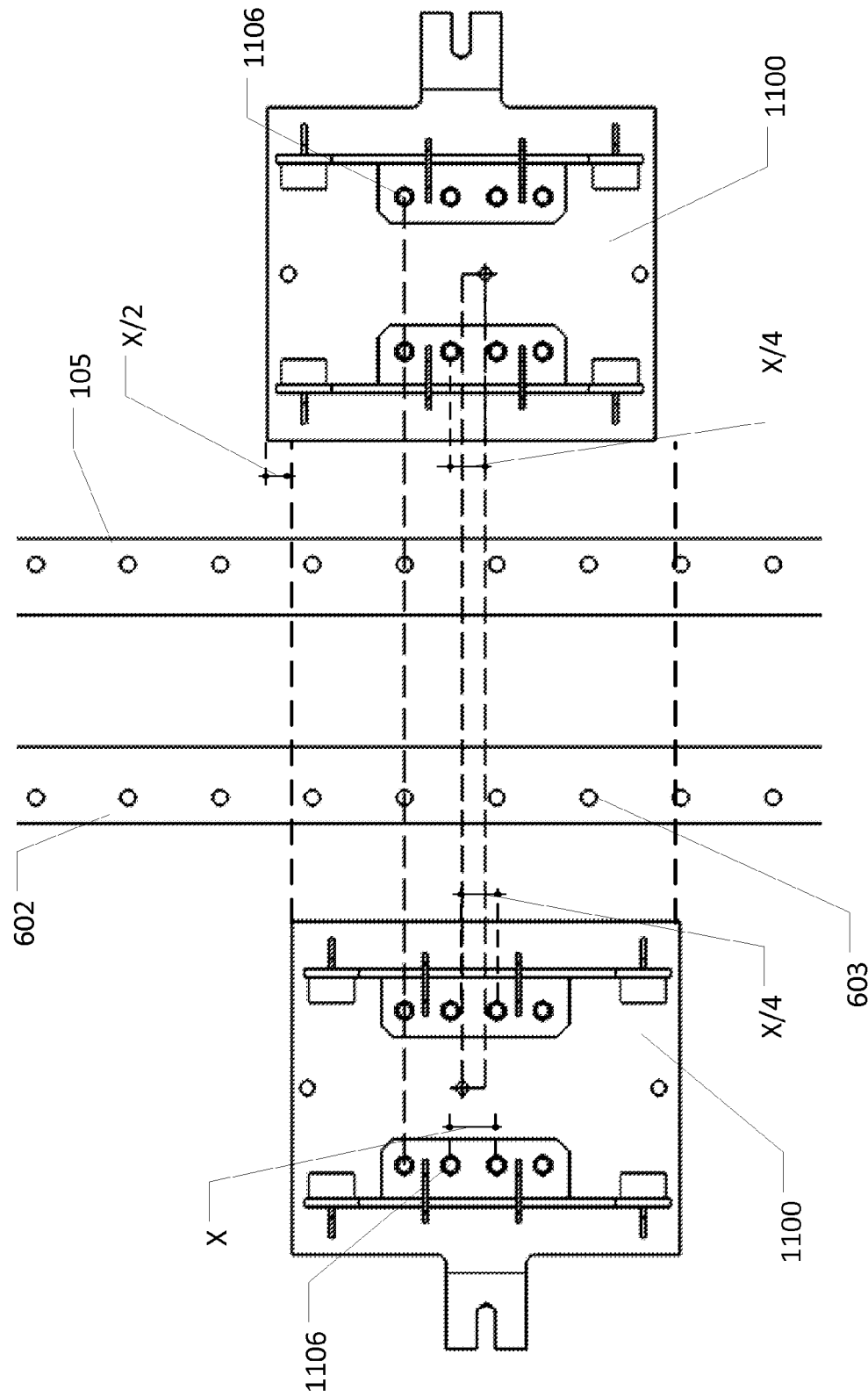
FIG. 14D illustrates an embodiment of a sliding plate wherein a sliding plate mounts in different positions depending on its mounting direction.

FIG. 14D illustrates an embodiment of sliding plate 1100 wherein sliding plate mounts in different positions depending on its mounting direction. In one embodiment, sliding plate 1100 can be mounted to swing arms 105 in two different directions. By positioning sockets 1106 of plate guides 1102 not on symmetry axis 1205 or an n*x/2 interval therefrom, plate guide 1102 will have a first set of positionable discrete points x distance apart, and a second set of discrete points x distance apart somewhere between the first set of points. Further, by positioning a socket 1106 of plate guides 1102 such that it is (n*x)/2+x/4 away from a lateral line 1402 passing through symmetry axis 1205, the second set of positionable discrete points will be a set of points that are each a center point between adjacent points with the first set of discrete sets. Practically speaking, the combination of the first set of points and second set of points will yield a set of points equally spaced apart at a distance of x/2. Similar to the example in FIG. 14C, to maintain a two-fastener connection on plate guide 1102 comprising four sockets 1106, guide holes 603 on swing arm 105 can be spaced 2*x apart. For example, if x is three inches, then sliding plate 1100 will be positionable at discrete points on swing arm 105 that are 1.5 inches. The set of points spaced 1.5 inches apart comprises a first set of points spaced 3 inches apart, related to sliding plate 1100 mounted to swing arm 105 in one direction, and a second set of points related to sliding point rotated 180 degrees, spaced three inches apart, but each of those points in the middle of adjacent points in the first set. To maintain a two-fastener connection with plate guide 1102 in this example, guide holes 603 in swing arm 105 can be placed six inches apart, just as in FIG. 14C. Such configuration of plate guide 1205 in FIG. 14D is beneficial because assembler of dolly-transport system 100 can have more precise control over the size of dolly-transport system 100 with less holes drilled in swing arm 105.

Figure 15:
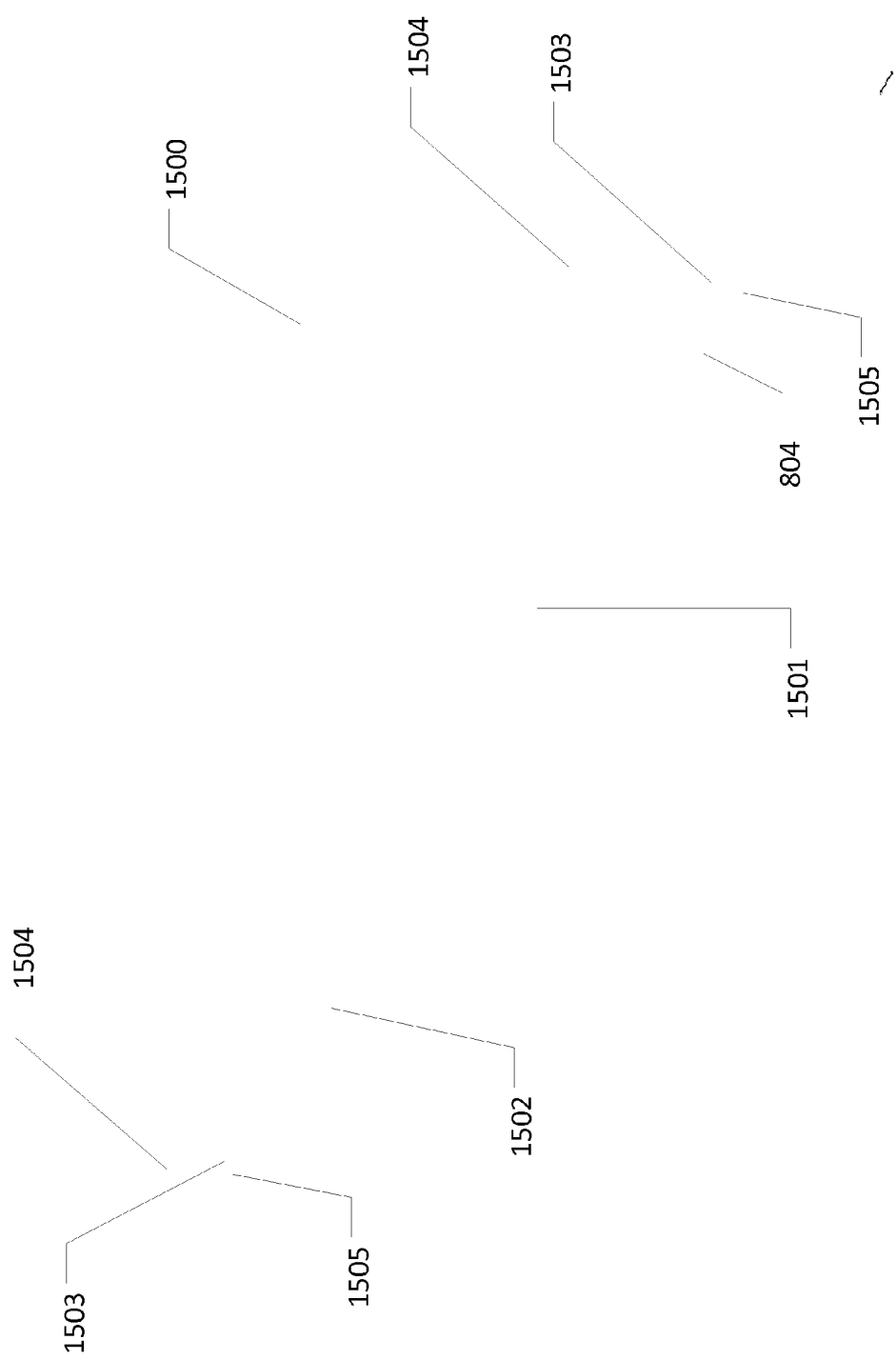
FIG. 15 illustrates a steering set comprising a steering frame, a pair of stabilizer, and a track rod.

FIG. 15 illustrates a steering set 1500 comprising a steering frame 1501, a pair of stabilizer 1502, and a track rod 1503. Steering frame 1501 can be a long horizontal rod that serves as a base structure for steering set 1500. Stabilizers 1502 can, in one embodiment, slidably mount to steering frame 1501. The space in between stabilizers 1502 can contour to center support 106a. Further in one embodiment, fasteners 804 can hold stabilizers 1502 in place by crimping or by passing through stabilizers 1502 and steering frame 1501. Steering set 1500 can comprise track rod 1503 on each end of steering frame 1501. Track rod 1503 can comprise a vertical column 1504, and a track base 1505 supporting vertical column 1504 that is slidably mountable to steering frame 1501, Fasteners 804 can hold track base 1505 in place by crimping or passing through track base 1505 and steering frame 1501. In one embodiment stabilizers 1502 and track rods 1503 can be permanently attached to steering frame 1501 through soldering, welding or through use of any adhesives. In another embodiment, stabilizers 1502 and track rods 1503 can be moveable and/or removable from steering frame 1501.

Figure 16:
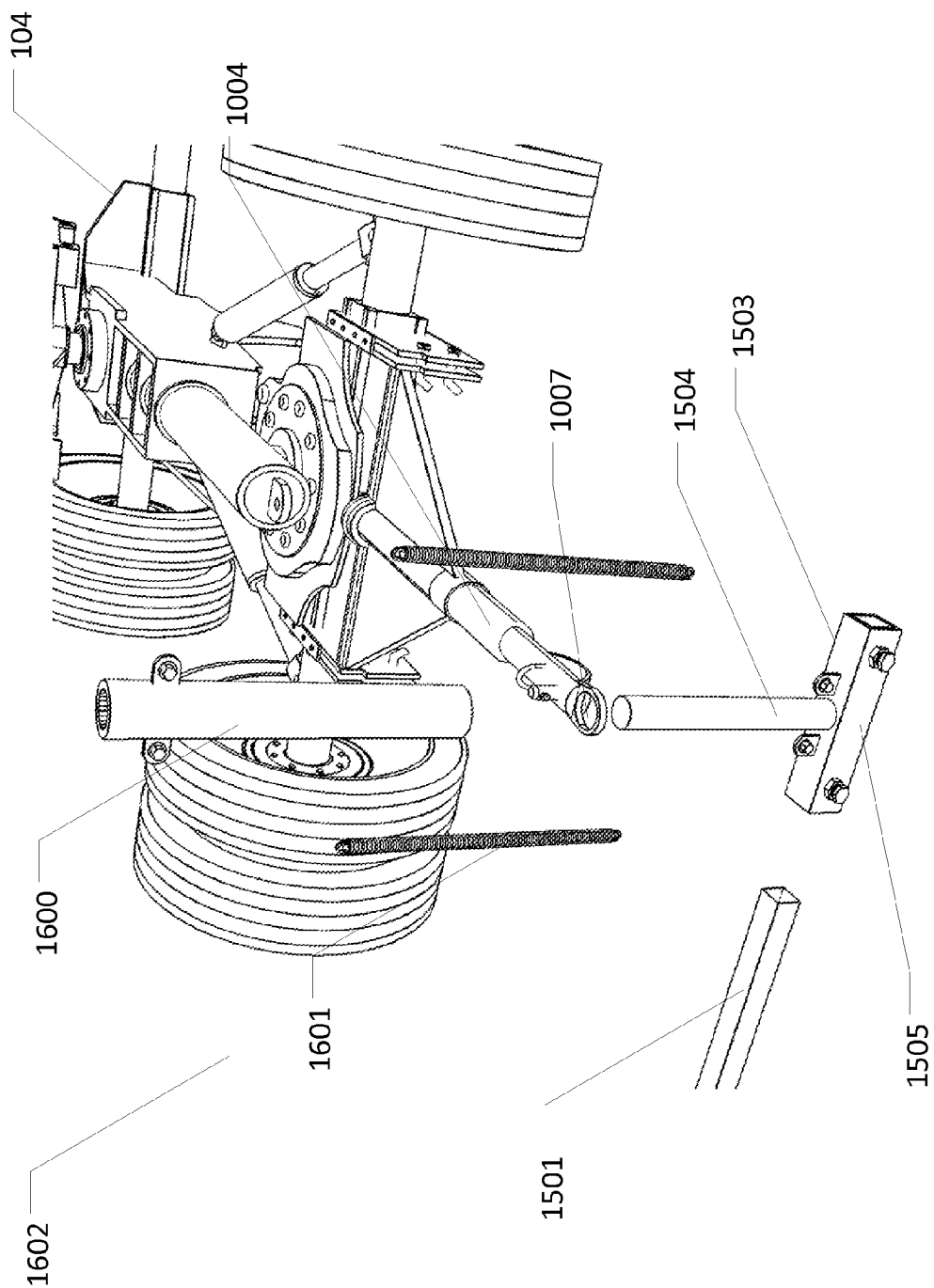
FIG. 16 illustrates a column sleeve with a pair of biasing devices attached.

FIG. 16 illustrates a column sleeve 1600 with a pair of biasing devices 1601 attached. Column sleeve 1600 can be mateable with track rod 1503. Vertical column 1504 can pass through ring 1007. Once inside, column sleeve 1600 can pass over vertical column 1504. Column sleeve shall be designed such that it cannot pass through ring 1007. One or more biasing devices 1601 can connect column sleeve to track rod 1503, preferably at track base 1505. Biasing device can be connected to column sleeve 1600 and track rod 1503 using any methods known in the art that are appropriate for the particular biasing device. In one embodiment, biasing device 1601 can comprise a spring. In another embodiment, biasing device 1601 can comprise a rubber band or any other rugged elastic material. Biasing device 1601 can be used to provide force or tension to column sleeves 1600.

In one embodiment track rod 1503, column sleeve 1600, and biasing devices 1601 together, for purposes of this disclosure can be described as a suspension assembly 1602. Suspension assemblies 1602 can connect steering frame 1501 with center support 106a and dollies 104. As such, suspension assemblies 1602 can allow dolly-transport system 100 to be maneuvered. Moreover, suspension assembly 1602 can assist in supporting or distributing the weight of center support 106a.

FIG. 17 illustrates steering set 1500 attached to trailer 102 and dollies 104. Steering set 1500 can be positioned under trailer 102 placing trailer 102 in between stabilizers 1502. Once assembled, steering set 1500 can keep dollies 104 in a straight forward position. Further, steering system 1500 can allow for upward and downward movement of steering system 1500, preventing damage to steering system as dolly-transport system 100 moves.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A trailer comprising
a center support;
a plurality of swing arms mounted to the left side and the right side of said center support, said swing arms each comprising an arm and an arm hinge, said swing arms capable of rotating about said arm hinge, further wherein a dolly is capable of being mounted to each swing arm;
a plurality of stabilizer rods, each of said stabilizer rods comprising a first rod portion and a second rod portion, said first rod portion connected to said center support and said second rod portion connected to one of said swing arms, further wherein said first rod s portion is capable of retracting from said second rod portion, such that each of said swing arms are configured to fold substantially to the sides of said trailer.

2. The trailer of claim 1 further comprising a frame, said frame mounted at the top and at the bottom of said center support, wherein each of said arm hinge is mounted to said frame.

3. The trailer of claim 2 wherein said frame comprises a hinge interface, said swing arms further comprising an arm hinge, further wherein said hinge interface compatible with said arm hinge.

4. The trailer of claim 3 wherein said hinge interface is connectable to said arm hinge using a pin.

5. The trailer of claim 1 wherein said first rod portion is capable of extending from said second rod portion, such that each of said swing arms are fixed at an angle with the sides of said center support.

6. The trailer of claim 5 wherein said angle is between 85 and 95 degrees from said center support.

7. A trailer comprising
a center support;
plurality of swing arms mounted to the left side and the right side of said center support, said swing arms each comprising an arm and an arm hinge, wherein said arms each comprise a track, said swing arms capable of rotating about said arm hinge, further wherein a dolly is capable of being mounted to each swing arm;
a plurality of stabilizer rods, each of said stabilizer rods comprising a first rod portion and a second rod portion, said first rod portion connected to said center support and said second rod portion connected to one of said swing arms.

8. The trailer of claim 7 wherein said track each comprises protruding edges attached to a bottom portion of said arms.

9. The trailer of claim 8 wherein said trailer further comprising a plurality of sliding plates, each of said sliding plates comprising a top surface and a bottom surface, said top surface mounted to one of said tracks, further said bottom surface mounted to one of said dollies.

10. The trailer of claim 9 wherein each of said sliding plates comprising a plurality of sockets, said arms further comprising a plurality of guide holes, further wherein said guide holes connects with said sockets.

11. A dolly-transport system comprising
a plurality of trailers, at least one of said trailers connectable to a truck, each of said trailers comprising
a center support;
a plurality of swing arms mounted to the left side and the right side of said center support, said swing arms each comprising an arm and an arm hinge, said swing arms capable of rotating about said arm hinge, further wherein a dolly is capable of being mounted to each swing arm when said swing arm is in an open position;
a plurality of stabilizer rods, each of said stabilizer rods comprising a first rod portion and a second rod portion, said first rod portion connected to said center support and said second rod portion connected to one of said swing arms;
one or more load support connecting said trailers, said load support capable of supporting a load.

12. The dolly-transport system of claim 11 wherein each of said trailers further comprise a frame, said frame mounted at the top and at the bottom of said center support, wherein each of said arm hinge is mounted to said frame.

13. The dolly-transport system of claim 12 wherein said frame comprises a hinge interface, said swing arms further comprising an arm hinge, further wherein said hinge interface compatible with said arm hinge.

14. A method of adjusting the width of a trailer comprising
attaching a plurality of dollies to a trailer, said trailer comprising
a center support;
a plurality of swing arms mounted to the left side and the right side of said center support, said swing arms each comprising an arm and an arm hinge, said swing arms capable of rotating about said arm hinge, further wherein each of said dolly is capable of being mounted to each swing arm;
a plurality of stabilizer rods, each of said stabilizer rods comprising a first rod portion and a second rod portion, said first rod portion connected to said center support and said second rod portion connected to one of said swing arms, further wherein said first rod portion is capable of retracting from said second rod portion, such that each of said swing arms are configured to fold substantially to the sides of said trailer;
retracting said first portion from said second portion; and
folding said swing arms substantially to the sides of said trailer.

15. A method of adjusting the width of a trailer comprising
attaching a plurality of dollies each to one of a pluarlity of tracks on a trailer, said trailer comprising
a center support;
a plurality of swing arms mounted to the left side and the right side of said center support, said swing arms each comprising an arm and an arm hinge, wherein said arms each comprise one of said tracks, said swing arms capable of rotating about said arm hinge; and
a plurality of stabilizer rods, each of said stabilizer rods comprising a first rod portion and a second rod portion, said first rod portion connected to said center support and said second rod portion connected to one of said swing arms.

* * * * *